United States Patent
Kang et al.

(10) Patent No.: US 12,041,690 B2
(45) Date of Patent: Jul. 16, 2024

(54) METHOD AND DEVICE FOR INITIALIZATION BETWEEN USER EQUIPMENT AND UNIVERSAL INTEGRATED CIRCUIT CARD IN WIRELESS COMMUNICATION SYSTEM

(71) Applicant: Samsung Electronics Co., Ltd., Suwon-si (KR)

(72) Inventors: Sujung Kang, Suwon-si (KR); Duckey Lee, Suwon-si (KR); Jonghoe Koo, Suwon-si (KR); Kangjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/451,122

(22) Filed: Oct. 15, 2021

(65) Prior Publication Data
US 2022/0124481 A1 Apr. 21, 2022

(30) Foreign Application Priority Data

Oct. 16, 2020 (KR) .................. 10-2020-0134689
Feb. 17, 2021 (KR) .................. 10-2021-0021441

(51) Int. Cl.
*H04W 8/18* (2009.01)
*H04W 8/22* (2009.01)
*H04W 12/45* (2021.01)

(52) U.S. Cl.
CPC .......... *H04W 8/183* (2013.01); *H04W 8/22* (2013.01); *H04W 12/45* (2021.01)

(58) Field of Classification Search
None
See application file for complete search history.

(56) References Cited

U.S. PATENT DOCUMENTS 9,531,831 B1   12/2016 Cuadrat et al.
10,708,761 B1 * 7/2020 Yin .................. H04W 8/205
(Continued)

FOREIGN PATENT DOCUMENTS

KR   20170007807 A  * 1/2017
KR   10-2017-0082122 A   7/2017
(Continued)

OTHER PUBLICATIONS

Xiao_WO_2020-119632A1_pub.date_2020-06-18.pdf(Year: 2020).*
(Continued)

*Primary Examiner* — Jinsong Hu
*Assistant Examiner* — Alexander J Yi

(57) ABSTRACT

The disclosure relates to 5G or 6G communication systems to support a higher data rate after 4G communication systems, e.g., LTE. The disclosure provides a method performed by a user equipment (UE) in a wireless communication system, the method comprising: receiving, by a modem from an embedded universal integrated circuit card (eUICC), a first message including at least one of information related to whether eUICC functionality is supported and information related to whether multiple enabled profiles (MEPs) are supported; and determining, by the modem, to operate with an MEP function based on at least one of the received information related to whether the eUICC functionality is supported and information related to whether the MEPs are supported. Further, various embodiments of the disclosure provide a method and device for providing a dual-SIM function even in a UE equipped with a single eUICC in a wireless communication system.

18 Claims, 15 Drawing Sheets

(56) References Cited

U.S. PATENT DOCUMENTS

2013/0339305 A1* 12/2013 Kim .................. H04W 12/04
                                                707/652
2018/0160294 A1  6/2018 Lee et al.

FOREIGN PATENT DOCUMENTS

| KR | 10-2018-0062923 A | 6/2018 | |
|----|-------------------|--------|---|
| KR | 10-2022-0018875 A | 2/2022 | |
| KR | 10-2022-0018897 A | 2/2022 | |
| WO | WO-2016153303 A1 * | 9/2016 | ............ H04W 60/00 |

OTHER PUBLICATIONS

Gao_WO_2017-054172A1_pub.date_2017-04-06.pdf(Year: 2017).*
Pietig_ISO-IEC_7816-4_Version_2.2.2_pub.date_2014-12-10.pdf(Year: 2014).*
ETSI_TS_102_221_V3.5.0_pub.date_2001-10.pdf (Year: 2001).*
International Search Report and Written Opinion of the International Searching Authority in connection with International Application No. PCT/KR2021/014408 issued Jan. 21, 2022, 7 pages.
MediaTek Inc., "FS_eNPN: KI #4, New Sol: UE Onboarding and remote provisioning based on eSIM" SA WG2 Meeting #139E(e-meeting), S2-2004056, Jun. 1-12, 2020, Elbonia, 4 pages.

* cited by examiner

METHOD AND DEVICE FOR INITIALIZATION BETWEEN USER EQUIPMENT AND UNIVERSAL INTEGRATED CIRCUIT CARD IN WIRELESS COMMUNICATION SYSTEM

CROSS-REFERENCE TO RELATED APPLICATIONS

This application is based on and claims priority under 35 U.S.C. § 119 to Korean Patent Application No. 10-2020-0134689, filed on Oct. 16, 2020, in the Korean Intellectual Property Office, and Korean Patent Application No. 10-2021-0021441, filed on Feb. 17, 2021, in the Korean Intellectual Property Office, the disclosures of both of which are herein incorporated by reference in its entirety.

BACKGROUND

1. Field

The disclosure relates to a method and device for initialization between a UE and a universal integrated circuit card (UICC) in a wireless communication system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the ¹⁄₁₀ radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

A universal integrated circuit card (UICC) is a smart card inserted and used in a user equipment (UE), e.g., a mobile communication terminal, and is also referred to as a UICC card. The UICC may include an access control module for accessing a mobile communication service provider's network. Examples of such an access control module include a universal subscriber identity module (USIM), a subscriber identity module (SIM), and an Internet protocol multimedia service identity module (ISIM).

The UICC including a USIM is typically referred to as a USIM card. Likewise, the UICC including a SIM module is typically named an SIM card. It should be noted that in the following description, a SIM card may be used to mean a typical one including a UICC card, a USIM card, or a UICC including an ISIM. In other words, the technology for SIM cards may apply likewise to USIM cards, ISIM cards, or other common UICC cards.

A SIM card stores personal information about a mobile communication service subscriber, and upon access to a mobile communication network, authenticates the subscriber, and generates a traffic security key, enabling safe use of mobile communication services.

SIM cards are manufactured as dedicated cards for a particular mobile communication service provider at his request, and the SIM cards are equipped with authentication information for access to the network of the service provider, such as a universal subscriber identity module (USIM) application and international mobile subscriber identity (IMSI), K value, and OPc value, before the SIM cards are shipped out. The SIM cards so manufactured are delivered to the mobile communication service provider and then distributed to subscribers. Applications may be managed, e.g., installed, modified, or deleted in the UICC by utilizing, e.g., over the air (OTA) technique, as required to be done so later.

The subscriber may insert the UICC card into its own mobile communication terminal to use the mobile communication service provider's network and application services. Upon exchanging mobile communication terminals, the subscriber may pull the UICC card out of the existing mobile communication terminal and put the UICC card in the new mobile communication terminal so that the authentication information, mobile communication phone numbers, and personal contact information may be used on the new mobile communication terminal.

SUMMARY

Currently, in the wireless communication system, there is considered a scheme for handling an initialization procedure between the UE and the eUICC assuming that both the UE and the eUICC may simultaneously activate only one profile. Accordingly, a need arises for a scheme for efficiently handling initialization between the UE and the eUICC considering various scenario cases in the wireless communication system.

According to an embodiment, there is provided a method and device for initialization between a UE and an eUICC so that several profiles may simultaneously be activated and used on a UE equipped with one eUICC in a wireless communication system.

According to an embodiment, there is provided a method and device that simultaneously downloads two or more communication services on a UE and simultaneously use them in a wireless communication system.

According to an embodiment, there is provided a method and device for initialization between a UE and an eUICC for determining to support activation of multiple eSIM profiles in a wireless communication system.

According to an embodiment, there is provided a method and device that transfers predetermined information for supporting multiple enabled profiles (MEPs), including the number of profile-enabled eSIM ports or their respective numbers and all or some of a maximum number of eSIM ports that may be open, from an eUICC to a UE in a wireless communication system.

According to an embodiment, there is provided a method and device that determines whether to operate as an MEP through a combination of, e.g., predetermined information about MEP support obtained by a UE from an eUICC in a wireless communication system, the number of available basebands, and radio access technology (RAT) per baseband, and determine settings, such as of the number of eSIM ports to open, the number to be assigned to the eSIM port, and the eSIM port to use issuer security domain-root (ISD-R).

According to an embodiment, there is provided a method and device that transfers information set and determined as to whether to operate with MEPs from a UE to an eUICC in a wireless communication system.

According to an embodiment, there is provided a method and device in which, in a wireless communication system, an eUICC recognizes operating with MEPs, generates an eSIM port and assigns a number, maps the eSIM port number with a profile, determines the eSIM port to be used by the ISD-R, and replies to the UE with the results of processing.

According to an embodiment, there is provided a method and device that generates as many eSIM ports as the number of eSIM ports determined by a UE in a wireless communication system and then replies to an eUICC with termination of an initialization procedure to operate with MEPs.

According to an embodiment, there is provided a method and device that closes an eSIM port connection generated by a UE and processes connection with a corresponding pSIM in a case where the user deactivates one of profiles activated in an MEP-supporting eUICC and uses the pSIM in a wireless communication system.

According to an embodiment, there is provided a method and device in which, in a wireless communication system, an eUICC recognizes an eSIM Port Close request and processes the eSIM Port Close request and then replies to a modem with the results.

Objects of the disclosure are not limited to the foregoing, and other unmentioned objects would be apparent to one of ordinary skill in the art from the following description.

According to various embodiments, a method for initialization between a UE and a universal integrated circuit card (UICC) in a wireless communication system comprises receiving, from the UICC, a first message including at least one of information related to whether an embedded UICC (eUICC) functionality is supported, a maximum number of embedded subscriber identity module (eSIM) ports supportable in an eSIM, a number and numbers of profile-enabled eSIM ports, and an identifier of whether a multiple enabled profile (MEP) is supported, determining a transmission protocol with the UICC, transmitting capability information about the UE to the UICC, and identifying to operate in an MEP function based on at least one of the received information related to whether the eUICC functionality is supported, the maximum number of the eSIM ports, the number and numbers of the profile-enabled eSIM ports, and the identifier whether the MEP is supported.

According to various embodiments, a method for initialization between a UE and a UICC in a wireless communication system comprises transmitting, to the UE, a first message including at least one of information related to whether an eUICC functionality is supported, a maximum number of eSIM ports supportable in an eSIM, a number and numbers of profile-enabled eSIM ports, and an identifier of whether an MEP is supported, determining a transmission protocol with the UE, receiving, from the UE, capability information about the UE, and receiving, from the UE, a second message disclosing operating in an MEP function.

According to various embodiments, a UE in a wireless communication system comprises a modem and a eUICC. The processor is configured to control the transceiver to receive, from a eUICC, a first message including at least one of information related to whether an eUICC functionality is supported, a maximum number of eSIM ports supportable in an eSIM, a number and numbers of profile-enabled eSIM ports, and an identifier of whether an MEP is supported, determine a transmission protocol with the eUICC, control the transceiver to transmit capability information about the UE to the UICC, and identify to operate in an MEP function based on at least one of the received information related to whether the eUICC functionality is supported, the maximum number of the eSIM ports, the number and numbers of the profile-enabled eSIM ports, and the identifier whether the MEP is supported.

According to various embodiments, a eUICC in a wireless communication system comprises a transceiver and a processor connected to the transceiver. The processor is configured to control the transceiver to transmit, to a modem, a first message including at least one of information related to whether an eUICC functionality is supported, a maximum number of eSIM ports supportable in an eSIM, a number and numbers of profile-enabled eSIM ports, and an identifier of whether an MEP is supported, determine a transmission protocol with the UE, control the transceiver to receive, from the UE, capability information about the UE, and control the transceiver to receive, from the UE, a second message disclosing operating in an MEP function.

According to various embodiments, if an operation is processed with MEP, the user may simultaneously use profiles of several carriers on a UE equipped with one eUICC. Thus, user convenience may be enhanced. For example, when traveling abroad, the user may simultaneously use the existing domestic carrier profile and the local profile with one eUICC or, in the same country, the user may use two profiles of the same carrier with one eUICC, with subscriptions separated. Further, the UE manufacturer may connect one eUICC and one physical pint with a modem (providing two or more basebands), thus providing the dual SIM function without an additional UE mounting space. Although dual SIM is mentioned herein, it should be noted that it may also be used as a triple or quadruple SIM function depending on the number of basebands available.

According to various embodiments, a method performed by a user equipment (UE) in a wireless communication system, the method comprising: receiving, by a modem from an embedded universal integrated circuit card (eUICC), a first message including at least one of information related to whether eUICC functionality is supported or information related to whether multiple enabled profiles (MEPs) are supported; and opening, by the modem, at least one embedded subscriber identification module (eSIM) port based on the at least one of the information related to whether the eUICC functionality is supported or the information related to whether the MEPs are supported.

According to various embodiments, a user equipment (UE) in a wireless communication system, comprising: an embedded universal integrated circuit card (eUICC); and a modem; wherein the modem is configured to: receive, from the eUICC, a first message including at least one of information related to whether eUICC functionality is supported or information related to whether multiple enabled profiles (MEPs) are supported, and open at least one embedded subscriber identification module (eSIM) port based on the at least one of the information related to whether the eUICC functionality is supported or the information related to whether the MEPs are supported.

Further, when the UE reboots, the modem may maintain the same existing baseband-eSIM port association and, even when the user attempts to change one of the simultaneously activated profiles to a pSIM, it may process the change.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
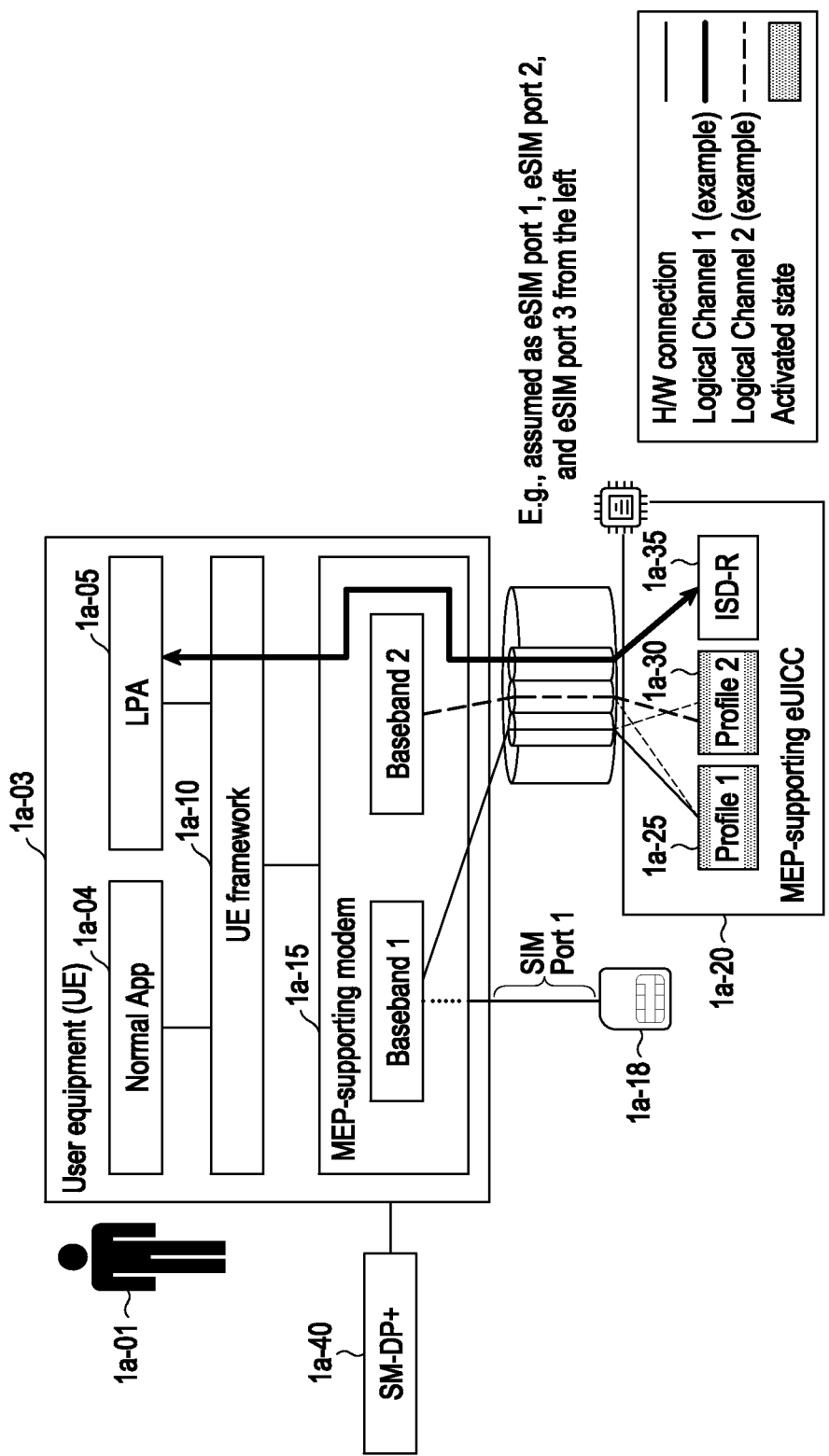
FIG. 1 is a view schematically illustrating a structure of a wireless communication system according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure. For the same reasons, some elements may be exaggerated or schematically shown. The size of each element does not necessarily reflect the real size of the element. The same reference numeral is used to refer to the same element throughout the drawings. Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification. When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Hereinafter, the base station may be an entity allocating resource to UE and may be at least one of gNode B, eNode B, Node B, base station (BS), wireless access unit, base station controller, or node over network. The UE may include UE (user equipment), MS (mobile station), cellular phone, smartphone, computer, or multimedia system capable of performing communication functions. In the disclosure, downlink (DL) refers to a wireless transmission path of signal transmitted from the base station to the UE, and uplink (UL) refers to a wireless transmission path of signal transmitted from the UE to the base station. Although LTE or LTE-A systems may be described below as an example, the embodiments may be applied to other communication systems having a similar technical background or channel pattern. For example, 5G mobile communication technology (5G, new radio, NR) developed after LTE-A may be included in systems to which embodiments of the disclosure are applicable, and 5G below may be a concept including legacy LTE, LTE-A and other similar services. Further, the embodiments may be modified in such a range as not to significantly depart from the scope of the disclosure under the determination by one of ordinary skill in the art and such modifications may be applicable to other communication systems. It should be appreciated that the blocks in each flowchart and combinations of the flowcharts may be performed by computer program instructions.

Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions. As used herein, the term "unit" means a software element or a hardware element such as a field-programmable gate array (FPGA) or an application specific integrated circuit (ASIC). A unit may play a certain role. However, the term "unit" is not limited as meaning a software or hardware element. A "unit" may be configured in a storage medium that may be addressed or may be configured to reproduce one or more processors. Accordingly, as an example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or subunits. Further, an element or a 'unit' may be implemented to reproduce one or more CPUs in a device or a security multimedia card. According to embodiments, a " . . . unit" may include one or more processors.

Hereinafter, the terms used herein are defined.

As used herein, the term "universal integrated circuit card (UICC)" means a smart card inserted and used in a mobile communication terminal, storing personal information about a mobile communication service subscriber, such as network access authentication information, phone number, or short message service (SMS), and enabling safe use of mobile communication services by authenticating the subscriber and generating a traffic security key when accessing a mobile communication network, such as a global system for mobile communication (GSM), wideband code division multiple access (WCDMA), long-term evolution (LTE), or fifth generation (5G) system. The UICC may be equipped with a communication application, such as a subscriber identification module (SIM), universal SIM (USIM), or IP multimedia SIM (ISIM), depending on the type of a mobile communication network accessed by the subscriber and may provide a high-level security function for equipping itself with various applications, such as electronic wallets, tickets, or electronic passports.

In the disclosure, the embedded UICC (eUICC) may be a security module embedded in the UE or may be of a removable type that may be inserted into and removed from the UE. The eUICC may download and install a profile using an over-the-air (OTA) technique. The eUICC may refer to a UICC capable of downloading and installing a profile.

As used herein, a method for downloading and installing a profile on the eUICC using an OTA technique may also be applicable to detachable UICCs detachably inserted into UEs as described above. For example, embodiments of the disclosure may apply to UICCs capable of downloading and installing a profile using an OTA technique.

As used herein, the term "UICC" may be interchangeably used with the term "SIM," and the term "eUICC" may be interchangeably used with the term "eSIM." UICC may be interchangeably used with physical SIM card or pSIM.

As used herein, the term "profile" may mean one obtained by packaging an application, file system, authentication key value or so stored in a UICC into a software form. Further, profile may be referred to as access information.

As used herein, the term "USIM profile" may have the same meaning as the term "profile" or may mean one obtained by packaging information contained in a USIM application in a profile into a software form.

In the disclosure, profile server refers to a server that may include the function of generating a profile, encrypting the generated profile, generating a profile remote management command, or encrypting the generated profile remote management command or may include the function of supporting activation of multiple profiles of the UE. Profile may also be referred to as subscription manager data preparation (SM-DP), subscription manager data preparation plus (SM-DP+), or subscription manager secure routing (SM-SR).

As used herein, the term "UE" or "device" may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the UE may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or UEs incorporating combinations of those capabilities. Further, the UE may include a machine to machine (M2M) terminal and a machine-type communication (MTC) terminal/device, but is not limited thereto. In the disclosure, the UE may be referred to as an electronic device or simply as a device.

In the disclosure, the UE or device may include software or an application installed on the UE or device to control the UICC or eUICC. Further, the UE or device may include a modem and a UE framework that is a UE operating system (OS). The software or application may be referred to as, e.g., local profile assistant (LPA). As used herein, the eUICC identifier (eUICC ID) may be a unique identifier of the eUICC embedded in the UE or may also be denoted an EID.

As used herein, an application protocol data unit (APDU) may be a message for a controller in the UE or device to interwork with the eUICC. The APDU is a pair of command and response, and the APDU command and the APDU response are defined in ETSI 102.221 with reference to ISO 7816. As defined in ETSI 102.221, the APDU command has a structure of Class of Instruction (CLA), Instruction (INS), Instruction Parameter 1 (P1), and Instruction Parameter 2 (P2), as the header of the APDU, and Number of bytes in the command data field (Lc), Data, and Number of bytes expected in response of the command (Le), as the body, and the APDU response has a structure of Optional Data field, Status byte 1 (SW1), and Status byte 2 (SW2). For detailed description, refer to the ETSI 102.221 standard.

As used herein, the term "profile package" may be interchangeably used with the term "profile" or may be used to denote a data object of a particular profile or may also be referred to as a profile TLV or profile package TLV. Profile identifier may be referred to as an ICCID as the unique identification number of the profile. A profile package encrypted using an encryption parameter may be denoted a protected profile package (PPP) or protected profile package TLV (PPP TLV). A profile package encrypted using an encryption parameter that may be decoded only by a particular eUICC may be denoted a bound profile package (BPP) or bound profile package TLV (BPP TLV). The profile package TLV may be a data set representing information constituting a profile in a tag-length-value (TLV) format.

As used herein, the AKA may denote an authentication and key agreement and may represent an authentication algorithm for accessing a 3GPP and 3GPP2 network. K is the encryption key value stored in the eUICC used for the AKA authentication algorithm and, in the disclosure, OPc is a parameter value that may be stored in the eUICC used for the AKA authentication algorithm.

As used herein, NAA may be a network access application program and may be an application program such as a USIM or ISIM stored in the UICC to access a network. NAA may be a network access module.

In the disclosure, end user, user, subscriber, and service subscriber may be used interchangeably as the user of the corresponding UE.

In the disclosure, eSIM port means a virtual logical interface channel obtained by multiplexing and dividing the physical interface connected with the eUICC-modem and may be interchangeably used with eSIM port, port, SIM port, logical Interface, or virtual interface.

In the disclosure, the functions of activating and managing a plurality of profiles existing in a single eUICC are collectively referred to as a multiple enabled profile (MEP) function. In conventional eUICCs, only one profile may be activated, so a single eUICC may not support the multi-SIM function. To support the multi-SIM function with a single eUICC, a function to activate and manage multiple profiles in a single eUICC is required. An eUICC in which the MEP function is implemented may be referred to as an MEP-supporting eUICC. A UE including a modem in which the MEP function is implemented and UE software capable of supporting the modem may be referred to as an MEP-supporting UE.

When determined to make the subject matter of the disclosure unclear, the detailed description of the known art or functions may be skipped.

Provided embodiments are described below with reference to the drawings.

A universal integrated circuit card (UICC) is a smart card inserted and used in a UE, e.g., a mobile communication terminal, and is also referred to as a UICC card. The UICC may include an access control module for accessing a mobile communication service provider's network. Examples of such an access control module include a universal subscriber identity module (USIM), a subscriber identity module (SIM), and an Internet protocol multimedia service identity module (ISIM).

The UICC including a USIM is typically referred to as a USIM card. Likewise, the UICC including a SIM module is typically named an SIM card. It should be noted that in the following description, a SIM card may be used to mean a typical one including a UICC card, a USIM card, or a UICC including an ISIM. In other words, the technology for SIM cards may apply likewise to USIM cards, ISIM cards, or other common UICC cards.

A SIM card stores personal information about a mobile communication service subscriber, and upon access to a mobile communication network, authenticates the subscriber, and generates a traffic security key, enabling safe use of mobile communication services.

SIM cards are manufactured as dedicated cards for a particular mobile communication service provider at his request, and the SIM cards are equipped with authentication information for access to the network of the service provider, such as a universal subscriber identity module (USIM) application and international mobile subscriber identity (IMSI), K value, and OPc value, before the SIM cards are shipped out. The SIM cards so manufactured are delivered to the mobile communication service provider and then distributed to subscribers. Applications may be managed, e.g., installed, modified, or deleted in the UICC by utilizing, e.g., over the air (OTA) technique, as required to be done so later.

The subscriber may insert the UICC card into its own mobile communication terminal to use the mobile communication service provider's network and application services. Upon exchanging mobile communication terminals, the subscriber may pull the UICC card out of the existing mobile communication terminal and put the UICC card in the new mobile communication terminal so that the authentication information, mobile communication phone numbers, and personal contact information may be used on the new mobile communication terminal.

However, the SIM card is inconvenient for the user of a mobile communication terminal to receive services from other mobile carriers. The mobile communication terminal user has the inconvenience of having to physically obtain a SIM card to receive a service from a mobile communication service provider. For example, when traveling to another country, the user inconveniently needs to get a local SIM card to receive a local mobile communication service. The roaming service addresses the inconvenience to some extent but the roaming service is expensive and may be unavailable unless there is a contract between the carriers.

Meanwhile, if a SIM module is remotely downloaded and installed on the UICC card, this inconvenience may be significantly reduced. In other words, the user may download a SIM module, for a mobile communication service he intends to use, on the UICC card at a desired time. The UICC card may download and install a plurality of SIM modules thereon and choose and use only one of the SIM modules. Such UICC card may be, or may not be, fixed to the UE. In particular, a UICC used fixed to a UE is called an embedded UICC (eUICC). Typically, the eUICC means a UICC that is used fixed to a UE and may remotely download and choose a SIM module. In the disclosure, UICC cards capable of remotely downloading and choosing a SIM module are collectively referred to as an eUICC. In other words, among UICC cards capable of remotely download and choose a SIM module, UICCs fixed or not fixed to a UE are collectively denoted an eUICC. Further, SIM module information downloaded is collectively denoted an eUICC profile.

Even when there is more than one profile in the eUICC, only one profile may be enabled at the same time. Therefore, although the UE supports two or more basebands, and two or more profiles exist in the corresponding eUICC, the UE may not support the dual SIM function, which enables two profiles to be used simultaneously on one mobile phone. This may be solved by mounting two eUICCs on the UE.

However, this approach requires an additional eUICC module and a physical interface to connect the eUICC module to the baseband of the modem. Thus, the UE manufacturer is required to pay for purchasing physical pins for the additional eUICC module and the physical interface. Further, such an issue also arises as to secure a mounting space of the UE due to adoption of the module and the physical pins.

Currently, since both the UE and the eUICC processes UE-eUICC initialization under the assumption that only one profile is simultaneously activated in the eUICC, a method for determining to support multiple enabled profiles (MEPs) in the UE-eUICC initialization process and operations to be processed by the UE or eUICC according to the determination are not defined. Therefore, the disclosure addresses the issues. Further, in the case where the user deactivates one profile, which is active, in an eUICC and instead uses a physical SIM card (hereinafter, a 'pSIM') on the eSIM UE equipped with the pSIM and the MEP-supporting eUICC, it is needed to change the UE-eUICC MEP settings. There is currently no consideration. Thus, it is intended to address such issues.

Currently, in the wireless communication system, there is considered a scheme for handling initialization between the UE and the eUICC assuming that both the UE and the eUICC may simultaneously activate only one profile. Therefore, in the initialization process between the UE and the eUICC, a method for determining to support the multiple enabled profiles (MEPs) and operations to be processed by the UE or the eUICC according to the determination are not defined. Accordingly, various embodiments provide an initialization method between a UE and an eUICC in a wireless communication system supporting MEPs.

Further, in the case where the user deactivates one profile, which is active, in an eUICC and instead uses a physical SIM card (hereinafter, a "pSIM") on the eSIM UE equipped with the pSIM and the MEP-supporting eUICC, it is needed to change the UE-eUICC MEP settings. However, since this is not taken into consideration for the current wireless communication systems, various embodiments provide a method for efficiently managing the MEP settings between a UE and an eUICC in a wireless communication system supporting MEPs.

FIG. 1 is a view schematically illustrating a structure of a wireless communication system according to various embodiments of the present disclosure.

A UE 1a-03 may include a normal app 1a-04, an LPA 1a-05, a UE framework 1a-10, and an MEP-supporting modem 1a-15. Here, the normal app 1a-40 is an app that has been preloaded or may be downloaded and installed on the UE, such as a carrier app or a SIM card manager app, and denotes an app that has authority of access to the profile of the pSIM 1a-18 or eUICC 1a-20. The LPA 1a-05 is an app responsible for control of the eUICC and processes management for the profile while communicating with the SM-DP+ 1a-40 and the UE user 1a-01, and the ISD-R 1a-35 in the eUICC 1a-20. The LPA 1a-05 may be implemented alone or integrated into another general UE application.

The LPA 1a-05 may receive a remote profile management (RPM) message transferred from the user's input or the SM-DP+ 1a-40 and request to install/activate/deactivate/update the profile on the eUICC 1a-20. The remote profile management (RPM) collectively refers to a series of procedures in which profile installation/activation/deactivation/deletion and other functions are performed by commands transmitted from the SM-DP+ 1a-40 to the UE. The RPM may be requested by the mobile network operator, the service provider, or the owner of the UE, and a command may be generated by the SM-DP+ 1a-40. The LPA 1a-05, which has received the user input for a request or permission for the management of the corresponding profile, may transmit a message to the eUICC 1a-20 according to the user input to manage/control the operation of the eUICC 1a-20.

The communication modem 1a-15 of the UE is a device that modulates and transmits signals for information transfer and demodulates and restore the original signal at the receiving side. An MEP-supporting modem may be equipped with two or more baseband processors (hereinafter, "basebands") for wireless communication. The baseband may also be implemented logically within the modem. The modem 1a-15 is connected with the UICC or eUICC by one physical pin (the ISO7816 standard is applied as a smart card interface at the time of the disclosure of the disclosure) and is operated in such a manner that if the modem transmits an application protocol data unit (APDU) command through the interface, the eUICC 1a-20 responds with a result value. A SIM card (pSIM) occupies one baseband of the modem through one physical pin, and one pSIM has one SIM port. SIM port may be used interchangeably with SIM card slot and is defined, in GSMA TS.37, as a physical and electronic housing provided on a device to accommodate a physical SIM card. The MEP-supporting eUICC 1a-20 is connected with the MEP-supporting modem 1a-15 through one physical pin, and the profile in the eUICC occupies one baseband. Each profile communicates with the baseband connected through one eSIM port.

In this drawing, with profile 1 1a-25 activated, eSIM port 1 is used to occupy baseband 1 and, with profile 2 1a-30 activated, eSIM port 2 is used to occupy baseband 2, and the pSIM 1a-18 is inserted, but it is intended to indicate a state in which there is no connection with the baseband. Meanwhile, the ISD-R 1a-35 is an entity in the eUICC that may be accessed only by the LPA 1a-05 or the modem, does not occupy the baseband in the modem, and may communicate with the LPA using an independent eSIM port (eSIM port 3 in this drawing). Alternatively, the ISD-R 1a-35 may use either eSIM port 1 or eSIM port 2 or may use any eSIM port without any limitation. Meanwhile, the functions of the LPA 1a-05, as software that operates on the UE platform, may be partially integrated into the UE platform. The message transmitted from the LPA 1a-05 to the eUICC 1a-20 may be transmitted via the UE platform or the UE platform and modem 1a-15 finally to the eUICC. Upon receiving the message, the eUICC 1a-20 performs a profile management operation of the eUICC according to the command transmitted from the LPA.

Although FIG. 1 illustrates an example in which two profiles, profile 1 and profile 2, exist in the eUICC 1a-20 for convenience of description, it should be noted that more profiles may exist depending on the memory capability of the eUICC 1a-20 without being limited thereto. If the eUICC supports MEPs, profile 1 1a-25 and profile 2 1a-30 may be activated at the same time and, if the eUICC does not support MEPs, one profile of profile 1 1a-25 or profile 2 1a-30 may be activated. The ISD-R 1a-35 creates a new ISD-P (meaning a security domain for hosting profiles) and provides the LPA with necessary eUICC data and service, e.g., local profile management, profile metadata information, required by the LPA function.

Although not shown in the eUICC 1a-20 of the UE 1a-03 of FIG. 1 for ease of description, credentials required in the security domains of the eUICC, e.g., certificate issuer's root public key for verifying the SM-DP+ certificate, embedded UICC controlling authority security domain, which is a space for storing, e.g., the keyset of the eUICC manufacturer, and eSIM platform, may be included. The UE framework 1a-10 means the operating system of the UE and exists between the modem and other UE systems and the normal app and LPA. The UE framework 1a-10 obtains information about the eUICC from the modem 1a-15 and retains the information and, if a request for information about the UE or eUICC is made from the normal app or LPA, replies with the information or transmits the APDU, transferred from the normal app or LPA, to the modem and receives a message responsive to the APDU from the modem and then transfers the message to the normal app or LPA.

As described above, the SM-DP+ server 1a-40 means a server that includes the function of generating a profile, encrypting the generated profile, generating a profile remote management command, or encrypting the generated profile remote management command or includes the function of supporting activation of multiple profiles of the UE. The LPA 1a-05 of the UE 1a-03 may receive an SM-DP+ remote management command from the SM-DP+ server 1a-40 and obtain the user's consent through interaction with the user 1a-01, and then, the LPA 1a-05 may transfer the remote management command to the eUICC 1a-20 to thereby process activation/deactivation/deletion/update.

Figure 2:
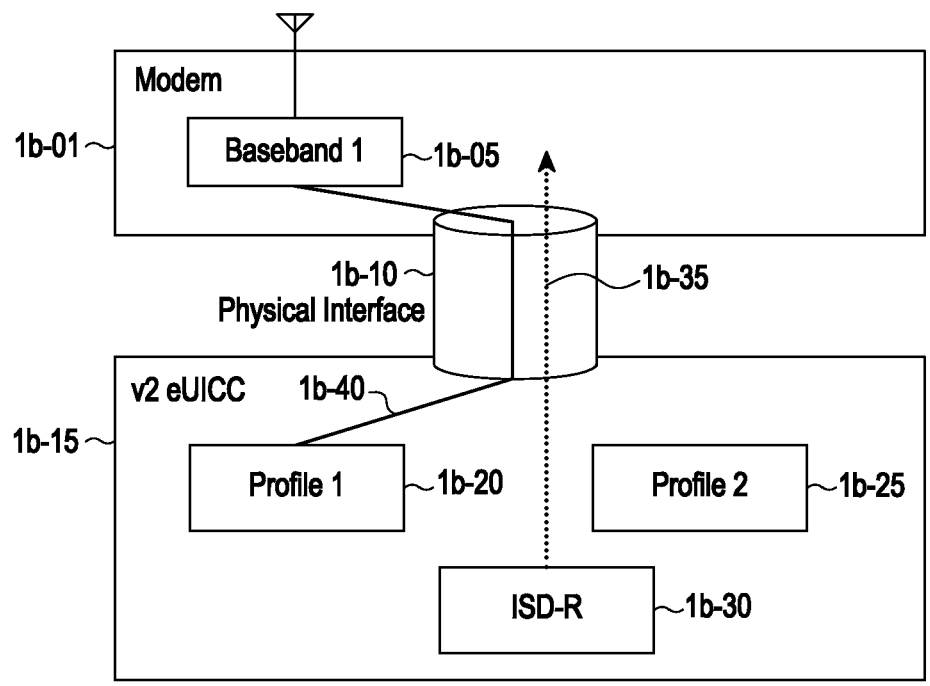
FIG. 2 is a view schematically illustrating an example (case 1) of connection between a modem and a current v2 embedded universal integrated circuit card (eUICC) not supporting a multiple enabled profile (MEP) in a wireless communication system according to various embodiments of the present disclosure.

FIG. 2 is a view schematically illustrating an example (case 1) of connection between a modem and a current v2 embedded universal integrated circuit card (eUICC) not supporting a multiple enabled profile (MEP) in a wireless communication system according to various embodiments of the present disclosure.

Figure 3:
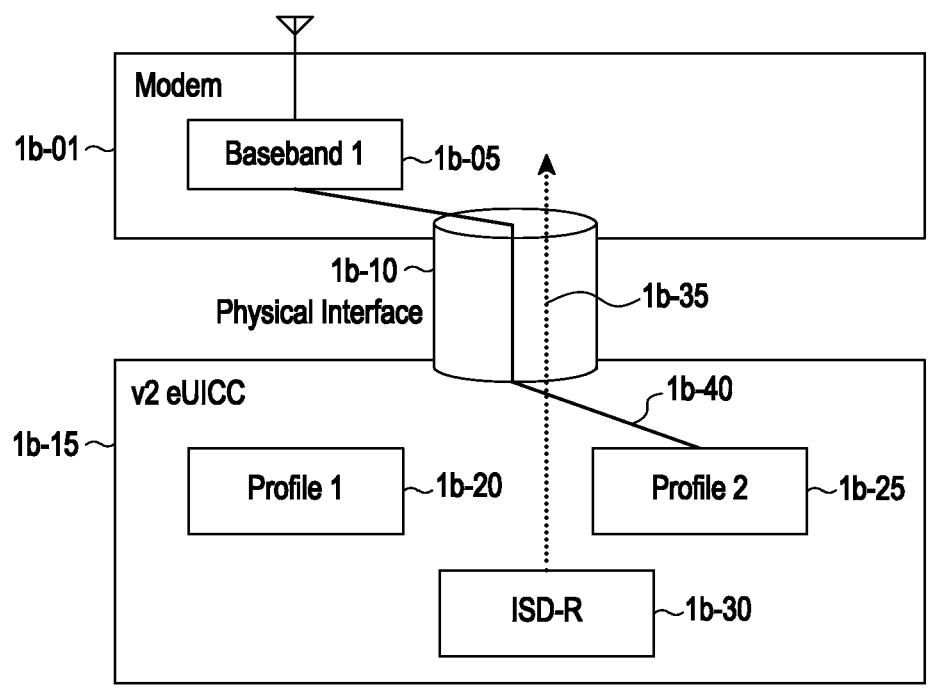
FIG. 3 is a view schematically illustrating another example (case 2) of connection between a modem and a current v2 eUICC not supporting an MEP in a wireless communication system according to various embodiments of the present disclosure.

FIG. 3 is a view schematically illustrating another example (case 2) of connection between a modem and a current v2 eUICC not supporting an MEP in a wireless communication system according to various embodiments of the present disclosure.

In the current v2 eUICC, only one profile may be activated in the eUICC, and it may only perform the user's local profile management without intervention of the SM-DP+ to process, e.g., activation/deactivation/deletion/update of the pre-installed profile. Given simultaneous use of the physical SIM card together with the eUICC, the modem 1b-01, which does not support MEPs, may have one or more basebands, but in the instant description, one baseband is assumed.

After a UICC reset or profile status change, the UE may generate a channel(s) for APDU transmission between the modem and the eUICC in the process of performing initialization between the UE platform, modem, and eUICC.

In the v2 eUICC 1b-15, only one profile may be activated at the same time. Case 1 1b-100 of FIG. 2 illustrates that profile 1 1b-20 is activated and profile 2 1b-25 is deactivated, and case 2 1b-200 of FIG. 3 illustrates that profile 1 1b-20 is deactivated and profile 2 1b-25 is activated. Case 1 1b-100 is described. If APDU transmission to the baseband of the modem mapped in the one activated profile is necessary, the eUICC 1b-15 may transmit the corresponding APDU through a single channel of the physical interface 1b-10 connected to the modem 1b-01. If the ISD-R 1b-30 receives, from the LPA, a request for changing the status of the profile, e.g., an ES10c.EnableProfile(Profile2) request for a status change from case 1 1b-100 to case 2 1b-200, the ISD-R 1b-30 may transmit, to the modem 1b-10, a REFRESH Proactive Command for deleting the data of the existing cached profile and restart of an application session.

Further, if the ISD-R 1b-30 receives an eUICC memory reset request from the LPA, the ISD-R 1b-30 may transmit, to the modem 1b-10, an APDU for deleting the data of the existing cached UICC and restart of an application session, as the REFRESH proactive command. The APDU, transmitted from the ISD-R 1b-30 to the modem 1b-01, may also be transmitted through the single channel of the aforementioned physical interface 1b-10.

Figure 4:
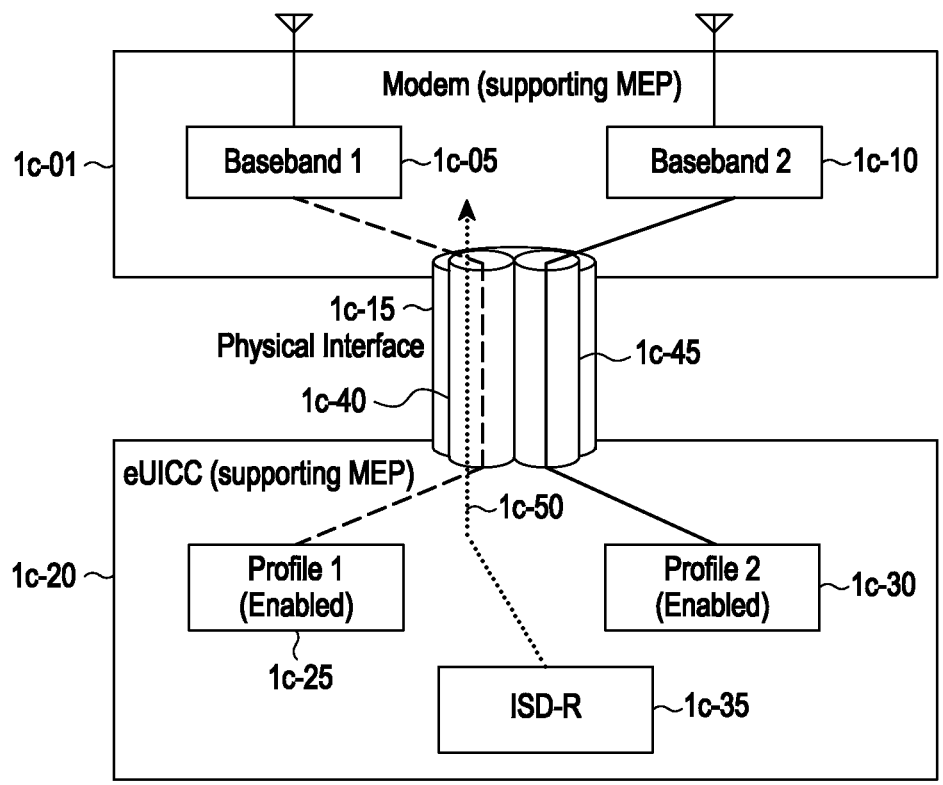
FIG. 4 is a view schematically illustrating an example (case 1) of connection between a modem and a v3 eUICC as the concept of a virtual interface is adopted in a wireless communication system according to various embodiments of the present disclosure.

FIG. 4 is a view schematically illustrating an example (case 1) of connection between a modem and a v3 eUICC as the concept of a virtual interface is adopted in a wireless communication system according to various embodiments of the present disclosure.

Figure 5:
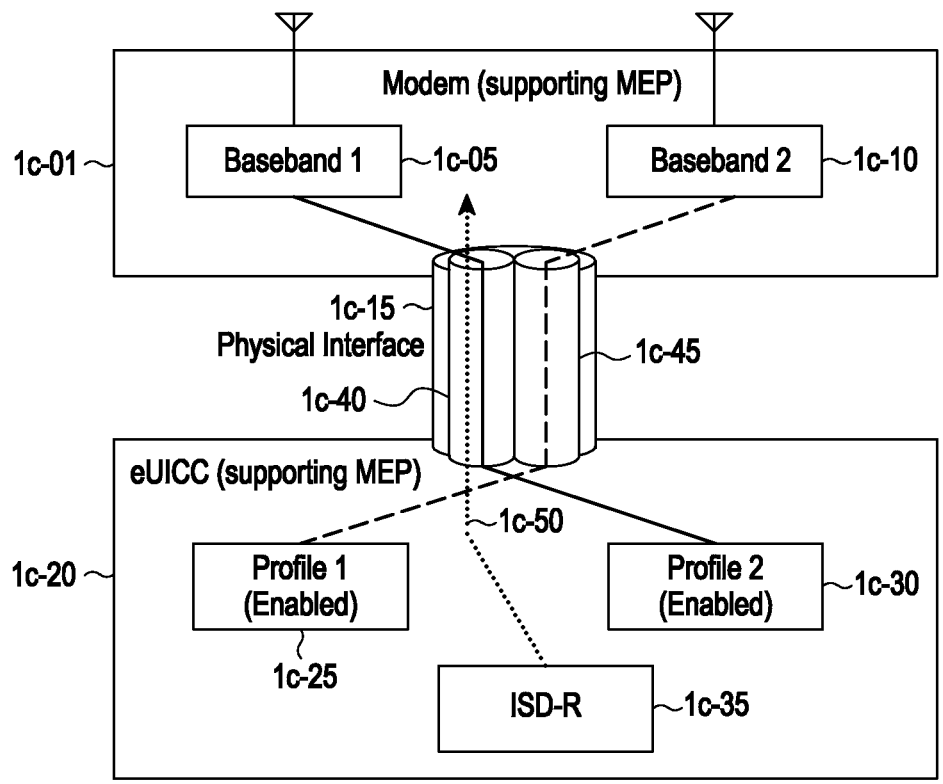
FIG. 5 is a view schematically illustrating another example (case 2) of connection between a modem and a v3 eUICC as the concept of a virtual interface is adopted in a wireless communication system according to various embodiments of the present disclosure.

FIG. 5 is a view schematically illustrating another example (case 2) of connection between a modem and a v3 eUICC as the concept of a virtual interface is adopted in a wireless communication system according to various embodiments of the present disclosure.

It is assumed that the eUICC 1c-20 of FIGS. 4 and 5 is an eUICC supporting the MEP function, which may simultaneously activate a plurality of profiles. It is also assumed that the modem 1c-01 supports the MEP function. A context in which there are two basebands and two activated profiles is described in connection with FIG. 4, as an example. A mapping switch is possible between the eSIM port and the baseband in the modem 1c-01 according to a command received from the SIM management app of the UE through the UE framework to the modem. However, the description of case 1 and case 2 is limited to mapping of the logical UE endpoint in the modem 1c-01 to baseband 1 1c-05-channel 1 1-40 and baseband 2 1c-10-channel 2 1-45 not to cloud the issue.

Although it is illustrated in the drawings that the ISD-R shares the eSIM port allocated to a specific profile, embodiments of the disclosure are not limited. The ISD-R may be allocated independently from the eSIM port allocated to the profile. It is assumed in FIGS. 4 and 5 that the eUICC 1c-20 is an eUICC supporting the MEP function which may activate a plurality of profiles at the same time. It is also assumed that the modem 1c-01 supports the MEP function. A context in which there are two basebands and two activated profiles is described in connection with FIG. 4, as an example. A mapping switch is possible between the eSIM port and the baseband in the modem 1c-01 according to a command received from the SIM management app of the UE through the UE framework to the modem. However, the description of case 1 and case 2 is limited to mapping of the logical UE endpoint in the modem 1c-01 to baseband 1 1c-05-channel 1 1-40 and baseband 2 1c-10-channel 2 1-45 not to cloud the issue.

Although it is illustrated in the drawings that the ISD-R shares the eSIM port allocated to a specific profile, embodiments of the disclosure are not limited thereto. For example, the ISD-R may use an eSIM port allocated for an ISD-R independent from the eSIM port allocated to the profile.

As described above in connection with FIGS. 2 and 3, the current modem 1a-15 is connected with the eUICC 1a-20 through one physical pin, and the modem and the eUICC transmit an APDU command using a single channel (1b-10) through the physical pin. The eUICC 1c-20 supporting MEPs activates multiple profiles, and the activated profiles require APDU transmission with a specific baseband of the modem. Therefore, such a concept may be introduced as to divide the physical interface 1c-15 for processing the physical interface 1c-15 into several virtualized interfaces and multiplex to separately transmit (1c-40 and 1c-45) an APDU through each interface.

For convenience of description below, one virtualized logical interface is referred to as an eSIM port if MEPs are supported, and each of the virtualized logical interfaces is referred to as eSIM port 1 1c-40 and eSIM port 2 1c-45, respectively. In the process of UE platform-modem-eUICC initialization after UICC reset or profile status change, the UE may generate and open an eSIM port for APDU transmission between the modem baseband and the eUICC and generate a channel and, at this time, the UE may set an ID for the eSIM port connected with each baseband. The corresponding port ID may be set by the modem or UE platform and transferred to the LPA. Port ID is used interchangeably with port number for convenience of description in the disclosure. The modem may have as many eSIM ports to be activated by the profile as the number of basebands. When the ISD-R uses independent ports, the number of eSIM ports may be larger than the number of basebands (+1).

When the pSIM occupies one baseband, the number of eSIM ports may be smaller than the number of basebands (except for the one occupied by the pSIM). The number of eSIM ports connected with the profile in the eUICC 1c-20 (hereinafter, "profile eSIM port") may be equal to or smaller than the number of profiles that may simultaneously be activated in the eUICC. The profile may transmit an APDU message using one of the eSIM ports. In case 1 1c-100 shown in FIG. 4, the APDU command corresponding to activated profile 1 1c-25 may be transmitted to baseband 1 1c-05 through eSIM port 1, and the APDU command corresponding to activated profile 2 1c-30 may be transmitted to baseband 2 1c-10 through eSIM port 2 1c-45.

In case 2 1c-200 shown in FIG. 5, the APDU command corresponding to activated profile 1 1c-25 may be transmitted to baseband 2 1c-10 through eSIM port 2 1c-45, and the APDU command corresponding to activated profile 2 1c-30 may be transmitted to baseband 1 1c-05 through eSIM port 1 1c-40. The MEP-supporting modem 1c-01 may distinguish and process which baseband the APDU command transmitted to each eSIM port is connected to. Meanwhile, the ISD-R 1c-35 needs to transmit an APDU command to the modem for managing the status of the eUICC and the profile. In this case, the ISD-R 1c-35 may transmit the APDU command in two schemes.

1) Multi-selected: The LPA or modem may select the ISD-R 1c-35 through multiple eSIM ports during an eUICC initialization process. This state may be called multi-selected. In the Multi-selected case, the LPA or modem may perform polling to identify whether there is an APDU to be transmitted or an event to be processed by the ISD-R 1c-35 or to send an APDU command to the ISD-R 1c-35 through one of the eSIM ports that have been selected. The ISD-R 1c-35 may select a proper eSIM port and transmit a proactive APDU command to the port, depending on whether the received command is a management message corresponding to profile 1 1c-25 or profile 2 1c-30 or a message for the whole eUICC.

2) Non multi-selected: The LPA or modem may select the ISD-R 1-35 with only one eSIM port during an eUICC initialization process. This state may be called Non Multi-Selected. In the Non Multi-Selected case, the APDU command may be sent to the ISD-R 1c-35 through only one eSIM port that has been selected. Further, it is possible to perform polling to identify whether there is an APDU to be transmitted or an event to be processed by the ISD-R 1c-35 through only one eSIM port that has been selected. In a case where the ISD-R 1c-35 is supposed to send a proactive APDU command, if a proactive APDU command is transmitted to the modem 1c-01 through the eSIM port that has been previously selected, the modem may interpret information about the received command and execute the requested command. It should be noted that in the non-multi selected case, a profile and a port may be shared, or it may exist as a dedicated ISD-R eSIM port that does not share a profile and a port.

Figure 6:
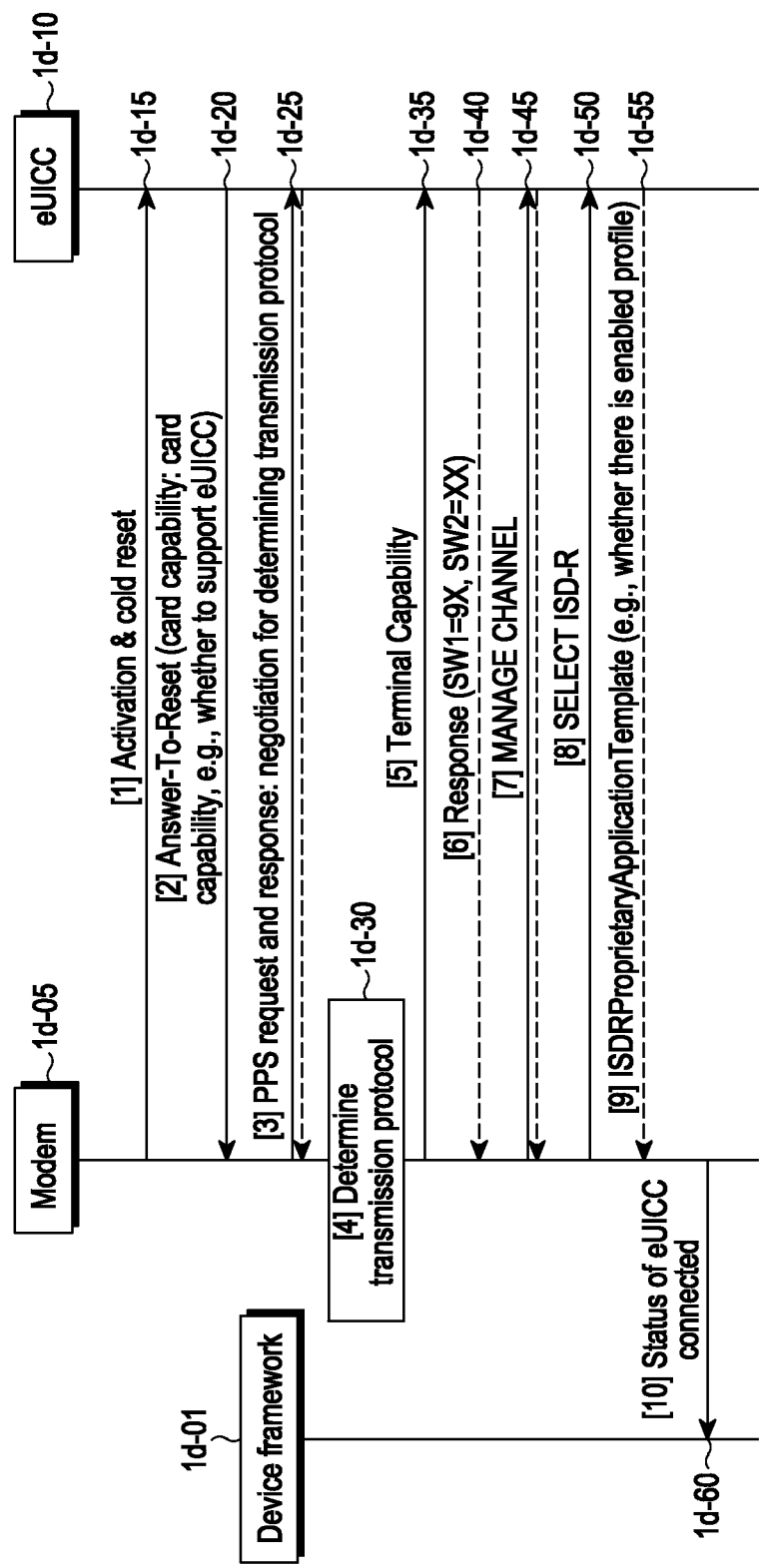
FIG. 6 is a view schematically illustrating an example of an initialization process between a UE and an eUICC in a wireless communication system according to various embodiments of the present disclosure.

FIG. 6 is a view schematically illustrating an example of an initialization process between a UE and an eUICC in a wireless communication system according to various embodiments of the present disclosure.

If the eUICC card is inserted into the UE, the modem 1d-05 recognizes the eUICC 1d-10 and performs activation and cold reset to set an operating environment for an operation with the eUICC card, such as power supply, clock synchronization, current, and voltage, to use the card. If the setting of the operating environment to use the eUICC is completed, the eUICC 1d-10 replies to the UE modem 1d-05 with an answer to reset (ATR) message. The answer to reset is a message that is first transmitted from the eUICC 1d-10 to the UE (or modem 1d-05), and message blocks constituted of up to 32 bytes are transmitted in a consecutive chain. The eUICC 1d-10 may include information (bit) as to whether to support the eUICC functionality defined in GSMA SGP. 22, as one of the message blocks defined as interface byte among the message blocks of the ATR message and may reply (1d-20) to the UE. The ATR may include additional card capability indicating various pieces of capability information about the eUICC, along with whether the eUICC functionality is supported.

According to an embodiment, the eUICC 1d-10 may reply with the ATR message including information about the supported transmission protocol and whether it is possible to change the transmission protocol. Thus, the modem 1d-05 may determine to use the transmission protocol supported by the eUICC card 1d-10 as it is or, if the ATR includes an identifier for the capability of changing the transmission protocol, additionally transmit a request for determining the transmission protocol and parameter to the eUICC 1d-10, thereby finally determining (1d-30) the transmission protocol to be used by the modem 1d-05 through the process of negotiating the transmission protocol to be used between the modem 1d-05 and the eUICC 1d-10. The UE (modem) and the card (eUICC) may transmit an application protocol data unit (APDU) message using either T=0 or T=1 which is the transmission protocol defined in ISO 7816-3, determined through an operation 1d-30. The APDU is a data unit consisting of a command-response pair and is used to process a message from an application to another application.

The modem 1d-05 may transmit (1d-35), to the eUICC 1d-10, the UE capability including the capability in the UE related to the eUICC defined in SGP. 22, such as whether the UE supports the LPA or supports the enterprise function. The eUICC 1d-10, which receives the UE capability message, may receive the tag value for the eUICC-related function of the UE capability to thereby recognize that the UE is a UE supporting the eUICC and set the setting value in the eUICC appropriate therefor, and reply with SW (Status Word)1=9X, SW2=XX, as a normal response code for the APDU command and reply (1d-40) to the modem 1d-05. In the SW, X denotes a specific number.

For example, X may be one of SW1=90, SW2=00 or SW1=91, SW2=XX. The modem 1d-05, which receives the message, may generate a manage channel APDU command for channel opening, transmit (1d-45) the manage channel APDU command to the eUICC 1d-10 and, in response thereto, receive a normal response from the eUICC 1d-10, thereby generating a channel for APDU transmission between the modem 1d-05 and the eUICC 1d-10. The ISD-R in the eUICC 1d-10 is a module for managing the profile in the eUICC. Only the LPA may select the ISD-R, and the ISD-R transmits/receives APDUs through a specific channel open in the modem. However, exceptionally, if the modem 1d-05 requires reception of additional information from the ISD-R of the eUICC 1d-10 in the process of initialization between modem and card, the modem 1d-05 may select (1d-50) the ISD-R.

If the modem 1d-05 selects the ISD-R, the ISD-R of the eUICC 1d-10 may provide the UE with additional information including, e.g., whether there is an activated profile, as an ISDR ProprietaryApplicationTemplate, as a value responsive thereto. The modem 1d-05, which receives the information, transfers (1d-60) the information obtained from the eUICC 1d-10 to the UE framework 1d-01 so that the information may be used by the application of the UE or the system. The UE framework 1d-10 may be referred to as a device framework. Although it is illustrated in the drawings that the transferred information 1d-60 is integrated into the UE framework 1d-01 and transmitted by the modem 1d-05 after receiving the ISDR ProprietaryApplicationTemplate, the information obtained at a specific time after the time of obtaining information from the eUICC 1d-10 by the modem 1d-05 may be transmitted sequentially or in combination.

FIGS. 7-9, 14, and 15 illustrate various embodiments for a process of providing MEP support information to the UE by the eUICC in a wireless communication system according to various embodiments and determining whether the UE and the eUICC operate with MEPs based on the MEP support information.

Although FIGS. 7-9, 14, and 15 illustrate an example in which the eUICC transfers predetermined information about MEP support to the UE (e.g., a UE including a modem) based on at least one of each ATR, reply value for the UE capability, ISDRProprietaryApplicationTemplate, file control parameter (FCP) template received from the eUICC by selecting the master file (MF) with the select APDU command transmitted from the UE to the eUICC, or reply value for the new logical interface management APDU, it should be noted that it is also possible to transfer, to the modem, one or more reply values of predetermined information necessary to determine as MEPs, e.g., a combination of the ATR and UE capability. The reply value may be referred to as a reply message. FIGS. 7-9, 14, and 15 illustrate various embodiments for a process of providing MEP support information to the UE by the eUICC in a wireless communication system according to various embodiments and determining whether the UE and the eUICC operate with MEPs based on the MEP support information.

Figure 7:
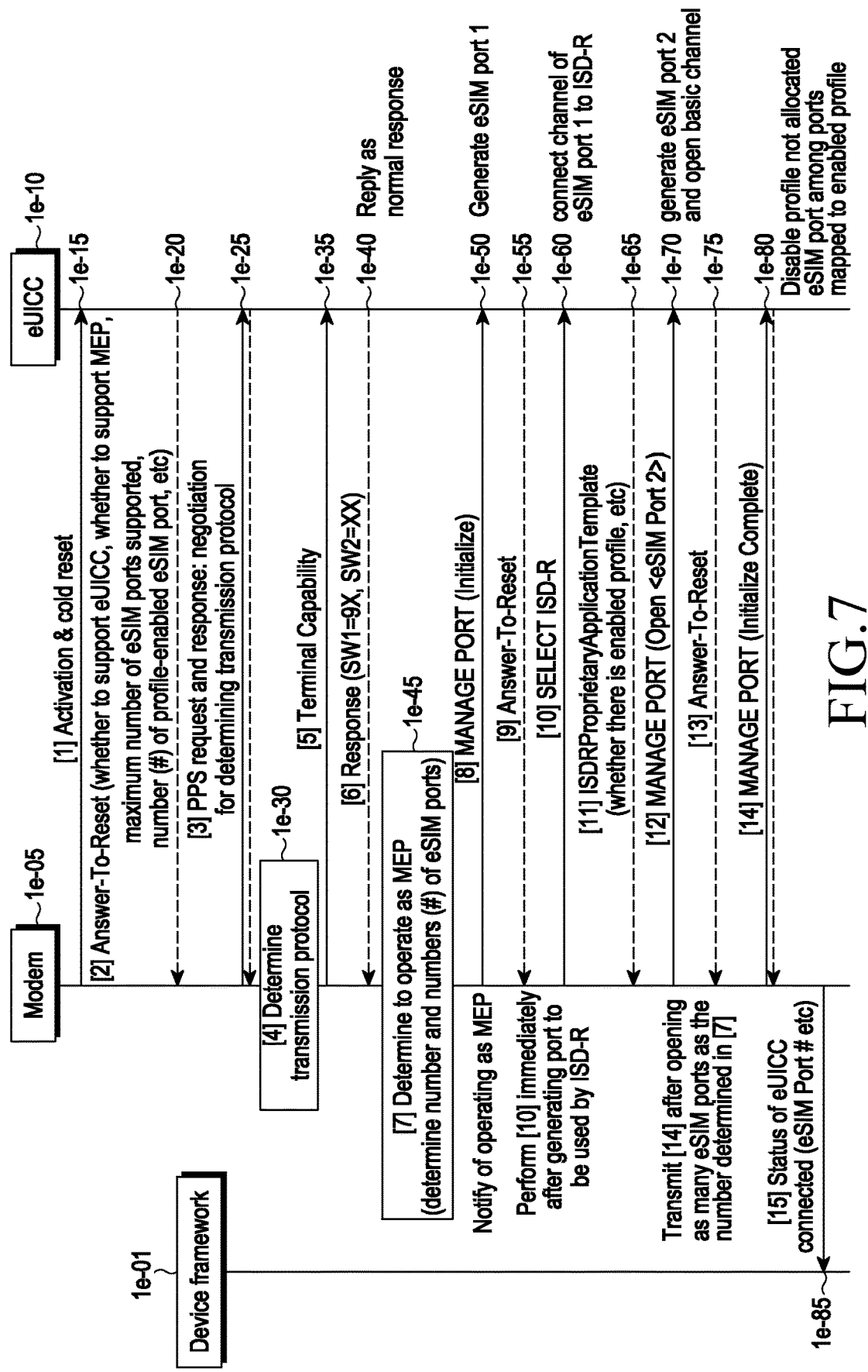
FIG. 7 is a view schematically illustrating another example of an initialization process between a UE and an eUICC based on answer to reset (ATR) in a wireless communication system according to various embodiments of the present disclosure.

Although FIGS. 7-9, 14, and 15 illustrate an example in which the eUICC transfers predetermined information about MEP support to the UE (e.g., a UE including a modem) based on at least one of each ATR, reply value for the UE capability, ISDRProprietaryApplicationTemplate, file control parameter (FCP) template received from the eUICC by selecting the master file (MF) with the select APDU command transmitted from the UE to the eUICC, or reply value for the new logical interface management APDU, it should be noted that it is also possible to transfer, to the modem, one or more reply values of predetermined information necessary to determine as MEPs, e.g., a combination of the ATR and UE capability. The reply value may be referred to as a reply message. FIG. 7 is a view schematically illustrating another example of an initialization process between a UE and an eUICC based on answer to reset (ATR) in a wireless communication system according to various embodiments of the present disclosure.

Referring to FIG. 7, as described above, if the eUICC is inserted into the UE, the modem 1e-05 recognizes the eUICC 1e-10 and performs activation and cold reset to set an operating environment for an operation with the eUICC card, such as power supply, clock synchronization, current, and voltage, to use the eUICC card. If the setting of the operating environment to use the eUICC card is completed, the eUICC 1e-10 replies to the UE modem 1e-05 with an answer to reset (ATR) message. The eUICC 1e-10 may include information as to whether to support the eUICC functionality defined in GSMA SGP. 22, through one of the message blocks defined as global interface byte among the message blocks of the ATR message and may reply (1e-20) to the modem 1e-05.

Here, if the eUICC 1e-10 supports eUICC functionality and also supports multiple enabled profiles (MEPs), the eUICC 1e-10 may reply with predetermined information necessary to determine to allow the modem 1e-05 to operate with the MEPs. This may be determined by including one or more of whether multiple enabled profiles (MEPs) are supported, the maximum number of openable (or supportable) eSIM ports, and the number or numbers of eSIM ports for which the profile is enabled. Whether the MEPs are supported may be determined by a combination of whether the eUICC functionality is included in the ATR and whether the logical interface(s) is supported. If whether eUICC is supported is included in the ATR, the maximum number of openable logical interfaces may be interpreted as identical to the maximum number of openable eSIM ports. The information may be transmitted in the interface bytes of the ATR or the historical bytes which are transmitted in blocks after the interface bytes. For example, the maximum number of logical interfaces that may be supported in historical bytes may be expressed in historical bytes like the maximum number of logical interfaces of Table A below or the logical interface number shown in Table N and Table N+1 of Table B.

The number of logical interfaces may be added as one type of types 9 to 15 or additional tables of type 7 currently defined among historical byte types (up to 15 types may be defined).

TABLE 1

Table A

| b8 | b7 | b6 | b5 | b4 | b3 | b2 | b1 | Meaning |
|----|----|----|----|----|----|----|----|---------|
| 1  | —  | —  | —  | —  | —  | —  | —  | Command Chaining |
| —  | 1  | —  | —  | —  | —  | —  | —  | Extended Lc and Le Field |
| —  | —  | —  | x  | x  | —  | —  | —  | Logical Interface number assignment by card xx = 10 by eUICC xx = 01 no logical interface xx = 00 |

TABLE 1-continued

Table A

| b8 | b7 | b6 | b5 | b4 | b3 | b2 | b1 | Meaning |
|----|----|----|----|----|----|----|----|---------|
| — | — | — | — | — | y | z | t | Maximum number of logical interface<br>y = z = t = 1 means 8 or more<br>y, z, and t not all set to 1 means 4y + 2z + t + 1 from one to seven |
| — | — | x | — | — | — | — | — | RFU |

TABLE 2

Table B (Table N)
Table N(Table B)

| b8 | b7 | b6 | b5 | b4 | b3 | b2 | b1 | Meaning |
|----|----|----|----|----|----|----|----|---------|
| 0 | 0 | 0 | x | — | — | — | — | Command chain Control |
| 0 | 0 | 0 | — | x | x | — | — | Secure Message Indication |
| 0 | 0 | 0 | — | — | — | x | x | Logical interface number from 1-3 |

TABLE 3

Table B (Table N + 1)
Table N + 1 (Table B)

| b8 | b7 | b6 | b5 | b4 | b3 | b2 | b1 | Meaning |
|----|----|----|----|----|----|----|----|---------|
| 0 | 1 | — | x | — | — | — | — | Command chain Control |
| 0 | 1 | x | — | — | — | — | — | Secure Message Indication |
| 0 | 0 | 0 | — | x | x | x | x | Logical interface number from 4-19 |

The eUICC 1e-10 may reply with the ATR message including information about the supported transmission protocol and whether it is possible to change the transmission protocol. Thus, the modem 1e-05 may determine to use the transmission protocol supported by the eUICC card as it is or, if the ATR includes an identifier for the capability of changing the transmission protocol, additionally transmit a request for determining the transmission protocol and parameter to the eUICC 1e-10, thereby finally determining (1e-30) by the modem 1e-05 through (1e-25) the process of negotiating the transmission protocol to be used between the modem 1e-05 and the eUICC 1e-10. The UE and the eUICC card may transmit an application protocol data unit (APDU) message using either T=0 or T=1 which is the transmission protocol defined in ISO 7816-3, determined through the transmission protocol determination operation 1e-30. The APDU is a data unit consisting of a command-response pair and may be used to process a message from an application to another application.

After the transmission protocol is determined, the modem 1e-05 may transmit (1e-35), to the eUICC 1e-10, the UE capability including the capability of the UE related to the eUICC defined in SGP. 22, such as whether the UE supports the LPA or supports the enterprise function. The eUICC 1e-10, which receives the message, may recognize that the UE is a UE supporting the eUICC and set the eUICC setting value appropriate therefor, and reply with SW1=9X, SW2=XX, as a normal response code for the APDU command and reply (1e-40) to the modem 1e-05. X of the SW may include a different number depending on the situation. In the SW, X may denote a specific number. For example, X may be one of SW1=90, SW2=00 or SW1=91, SW2=XX.

The modem 1e-05 may finally determine (1e-45) the number and/or the numbers of eSIM ports to be opened to activate the profile and whether to operate with MEPs considering at least one of the information obtained in the ATR received from the eUICC 1e-10, the stored mapping information between baseband and eSIM port, RAT information per supported baseband, and the occupancy status of the baseband. The determination of whether the MEP-supporting UE (modem) operates with MEPs may be determined as a case in which it is determined that there are two or more eSIM ports for which the profile was enabled through the information received through the ATR or as a case in which the UE modem, LPA, and eUICC all support the MEPs. Here, the maximum number of profile eSIM ports to be opened may be determined, e.g., as the smaller of the maximum number of eSIM ports, which the eUICC may open, and the number of basebands not occupied. Thus, if the ISD-R-dedicated eSIM port is used, the total number of eSIM ports to be opened may be the maximum number of profile eSIM ports plus one.

If the reply from the eUICC card lacks information (e.g., the number) about as many openable profile eSIM ports as possible, the UE may open as many profile eSIM ports as the maximum number of unoccupied basebands. If the modem 1e-05 finally determines (1e-45) to operate with the MEPs, an APDU command to initiate an operation with the MEPs, as a logical interface management command, may be transmitted (1e-50) to the eUICC 1e-10. For convenience of description below, the logical interface management command is referred to as a MANAGE PORT APDU command. An example of the MANAGE PORT APDU command may be an APDU command including INS=MANAGE PORT and P1=Initialize.

Upon receiving the MANAGE PORT APDU command, the eUICC 1e-10 may recognize that the UE operates with MEPs, creates one eSIM port, opens the basic channel, and replies with a response message. Alternatively, the eUICC 1e-10, which has received the MANAGE PORT APDU command to be replied with as a response message to the corresponding APDU command in the existing logical interface through which the APDU is transmitted, may recognize that the UE operates with MEPs, generate one eSIM port, open the basic channel, and reply with a response message thereto. Alternatively, a response message to the APDU command may be replied in the existing logical interface through which the APDU has been transmitted. According to an embodiment, the eUICC 1e-10 may reply (1e-55) with a response message to the MANAGE PORT APDU command including an answer to reset (ATR) corresponding to the logical interface, as data.

The modem 1e-05 may repeatedly request (1e-70) the MANAGE PORT APDU command for requesting to open an additional port, as many times as the number of eSIM ports determined in the operation 1e-45 and, as a response message thereto, the eUICC 1e-10 may transmit (1e-75) an answer to reset (ATR) corresponding to the logical interface, like the response message to the MANAGE PORT APDU command to initiate an operation with the MEPs. The APDU command for opening or generating a port may be an APDU command in which the instruction (INS) value of the APDU header is a value for logical interface management, e.g., manage port, and P1 is set to a value corresponding to initialization or opening, and may be transmitted including a set port number. For example, a port number set as the P2 value may be designated and transferred. If transmitted without a port number, the eUICC 1e-10 may designate a port number and reply with a response message for the designated number, so that the modem 1e-05 may map the port number opened with the corresponding number. In the case where the port is open, it may be implicitly defined that the corresponding port opens the basic channel.

Meanwhile, the ATR for each logical interface (eSIM port) may not be replied as the response message to the MANAGE PORT APDU command. In this case, the modem 1e-05 may map the ATR collected in the operation 1e-20 in the same manner for each eSIM port and transfer the ATR to the UE framework (device framework) 1e-01. In this case, assuming that eSIM port 1 and eSIM port 2 are in the eUICC at the request from the normal application (app) or LPA of the UE through GetATR( ) for eSIM port, the same ATR as the ATR collected in the operation 1e-20 may be replied. Further, in the case where the ATR for each logical interface (eSIM port) is replied as the response message to the MANAGE PORT APDU command, the modem 1e-05 maps the ATR for the corresponding logical interface (eSIM port) for each eSIM port and transfer the ATR to the UE framework 1e-01. For example, assuming that eSIM port 1 and eSIM port 2 are in the eUICC 1e-10, eSIM port 1 is mapped to the ATR replied in the operation 1e-55, and eSIM port 2 is mapped to the ATR replied in the operation 1e-75 and, at the request from the normal app or LPA of the UE through GetATR( ) for eSIM port, the corresponding information may be replied.

Meanwhile, if the eUICC 1e-10 receives an APDU command for opening or generating a port, i.e., an APDU command in which the instruction (INS) value of the APDU header is set to a value for logical interface management, e.g., a value corresponding to manage port, P1 initialization or opening, the eUICC 1e-10 performs a processing operation in which the port for APDU reception, received from the corresponding eSIM port, opens and sets a connection and, according to the modem-card settings, the basic channel is additionally opened with the corresponding eSIM port. If an activated profile is already in the eUICC 1e-10, the eUICC 1e-10 may map the eSIM port, generated through initialization or opening, to the eSIM port in which the profile has been already activated, and process it.

In the above-described procedure, the modem 1e-05 processes generation of the port to be used by the ISD-R and then transmits a SELECT APDU including an application identifier (AID) for the ISD-R to the eUICC 1e-10 through one channel in the generated port, thereby selecting the ISD-R (1e-60). As described above, if the modem 1e-05 selects the ISD-R in the initialization process, the ISD-R of the eUICC 1e-10 may provide the modem 1e-05 with additional information including, e.g., whether there is a profile activated with the ISDR ProprietaryApplication-Template as a reply value thereto (1e-65). If the modem 1e-05 generates as many ports as the number of eSIM ports determined in the operation 1e-45 to the eUICC 1e-10, the modem 1e-05 may transmit (1e-80) a MANAGE PORT APDU command including information about the completion of port generation to notify the eUICC 1e-10 that eSIM port generation for an operation with MEPs has been all completed. The MANAGE PORT APDU command for completing the corresponding port generation may be expressed as, e.g., INS=MANAGE PORT, P1=Initialize Complete.

Meanwhile, upon receiving the APDU command for port generation completion from the modem 1e-05, the eUICC 1e-10 may recognize that eSIM port generation has been completed. If there is an already activated profile in the eUICC, the eUICC may disable the profile to which the eSIM port is not allocated or may keep the profile active but treat the profile as if the profile were disabled.

As described above, the information received by the modem from the eUICC 1e-10 through the ATR may be transmitted (1e-85) by the modem 1e-05 to the UE framework (device framework) 1e-01. Although FIG. 7 illustrates that the information received from the eUICC 1e-10 through the ATR is transmitted from the modem 1e-05 to the UE framework 1e-01 at the time of completion of port generation, it is also possible to transmit the information after the time of obtaining information from the eUICC 1e-10 by the modem 1e-05. In other words, according to various embodiments, the time of transmission of the information, received from the eUICC 1e-10 through the ATR, from the modem 1e-05 to the UE framework 1e-01 may be adjusted as necessary.

Figure 8:
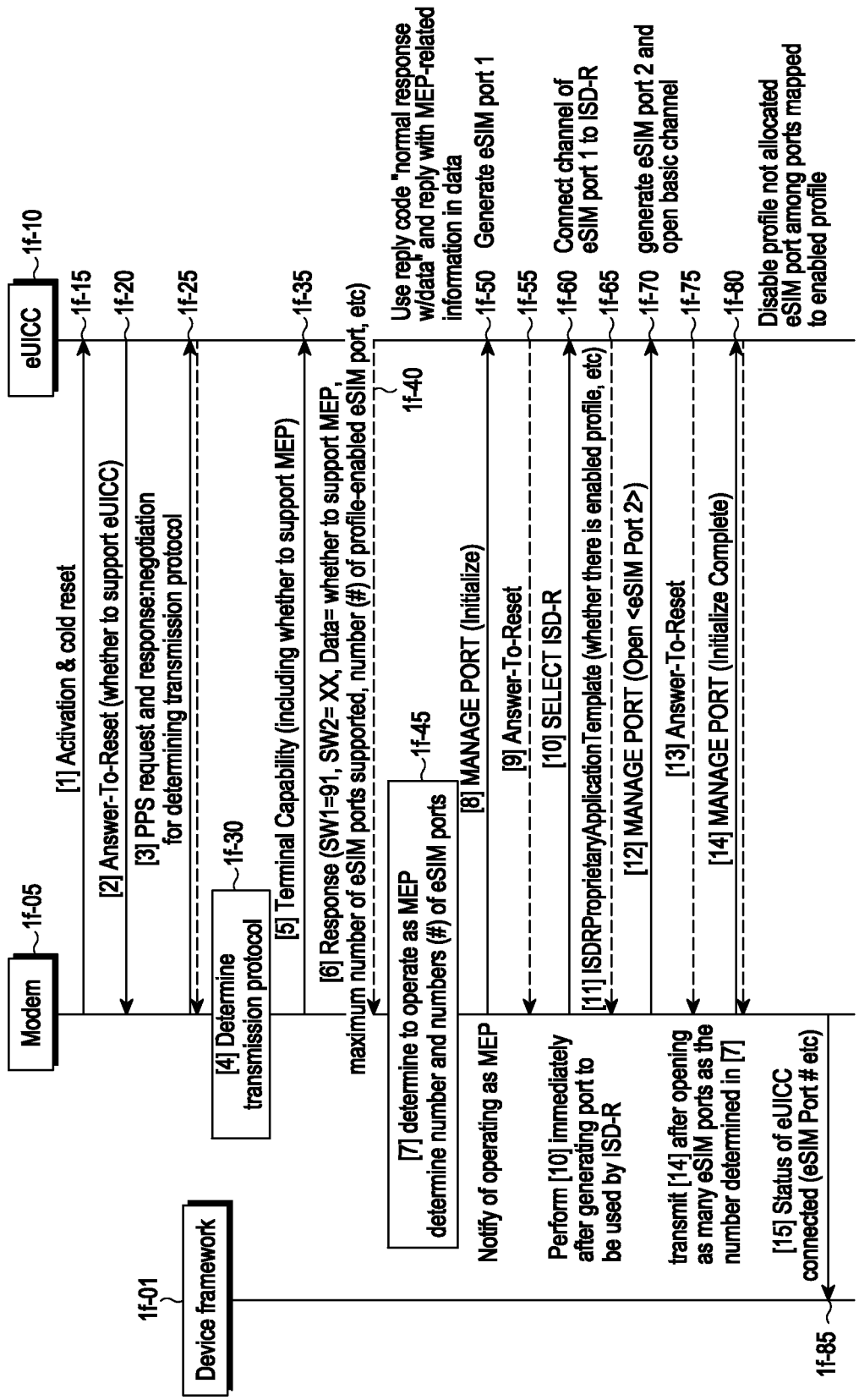
FIG. 8 is a view schematically illustrating another example of an initialization process between a UE and an eUICC based on UE capability information in a wireless communication system according to various embodiments of the present disclosure.

FIG. 8 is a view schematically illustrating another example of an initialization process between a UE and an eUICC based on UE capability information in a wireless communication system according to various embodiments of the present disclosure.

Referring to FIG. 8, some operations illustrated in FIG. 8 may be performed similarly to some operations of FIG. 7. According to an embodiment, operations 1f-15 to 1f-30 and 1f-45 to 1f-85 may be performed similarly to operations 1e-15 to 1e-30 and 1e-45 to 1e-85 of FIG. 7.

If the UE supports MEPs, the modem 1f-05 may include an identifier for the UE's MEP function support in the UE capability and transmit (1f-35) the identifier to the eUICC 1f-10. The modem 1f-05 may obtain predetermined information necessary to determine to operate with MEPs through a response message to the UE capability. If the UE capability includes the MEP support identifier, and the eUICC 1f-10 is an MEP-supporting eUICC 1f-10, the eUICC 1f-10 may reply with SW (Status Word)1=9X, SW2=XX, as a normal response code in the response message and may reply with data together with SW1=91, SW2=XX indicating that there is data in addition to the normal response code. In the SW, X may denote a specific number. As replied through an ATR in the operation 1e-20 of FIG. 7, the data included in the response APDU may be replied (1f-4) including one or more of information about whether multiple enabled profiles (MEPs) are supported, the maximum number of openable eSIM ports, the number of eSIM ports for which the profile is activated, or numbers. The information about whether MEPs are supported may include an identifier indicating whether MEPs are supported.

The modem 1f-05, which receives the information, may determine (1e-45) whether to operate with MEPs and the number and/or the numbers of profile eSIM ports to be opened to activate the profile based on a combination of RAT information for each baseband supported and the occupancy status of the baseband, and information obtained in the UE capability response message received from the eUICC 1f-10. The UE capability response message may include information about whether eUICC is supported.

The subsequent procedure may be performed in the same manner as described in FIG. 7. According to another embodiment, as described above, the modem 1f-05 may finally determine (1f-45) the number and/or the numbers of eSIM ports to be opened to activate the profile and whether to operate with MEPs additionally considering all or some of the information obtained in the UE capability response APDU received from the eUICC 1f-10, the mapping information between baseband and eSIM port, RAT information per supported baseband, and the occupancy status of the baseband. According to another embodiment, the modem 1f-05 may finally determine (1f-45) the number and the numbers of eSIM ports to be opened to activate the profile and whether to operate with MEPs considering the reply value of the UE capability received from the eUICC 1f-10, the stored mapping information between baseband and eSIM port, RAT information per supported baseband, and the occupancy status of the baseband.

A method for determining whether the MEP-supporting UE (modem) operates with MEPs may determine to operate with MEPs when it is determined that there are two or more profile-enabled eSIM ports as replying information of the UE capability or may determine to operate with MEPs when the UE modem and the LPA and the eUICC all support MEPs. The maximum number of profile eSIM ports to be opened, as determined in the operation 1f-45 may be determined as the smaller of the maximum number of openable eSIM ports by the eUICC and the number of unoccupied basebands in the modem. The total number of eSIM ports to be opened when an ISD-R-dedicated eSIM port is used may be the maximum number of profile eSIM ports plus one.

If the eUICC 1f-10 does not transmit the information about the maximum number of profile eSIM ports openable, the UE may open as many profile eSIM ports as the maximum number of unoccupied basebands. The subsequent operations 1f-50 and 1f-80 may be processed in the same manner as in FIG. 7. As described above, the information, received from the eUICC 1f-10 through the UE capability response message by the modem 1f-05, may be transmitted (1f-85) to the UE framework (device framework) 1f-01 by the modem 1f-05. Although FIG. 8 illustrates that the information received from the eUICC 1f-10 is transmitted at the time of completion of port generation, it is also possible to transmit the information after the time when the modem 1f-05 obtains information from the eUICC 1f-10 as described above in connection with FIG. 7. In other words, according to various embodiments, the time of transmission of the information received from the eUICC 1f-10 may be adjusted as necessary.

Figure 9:
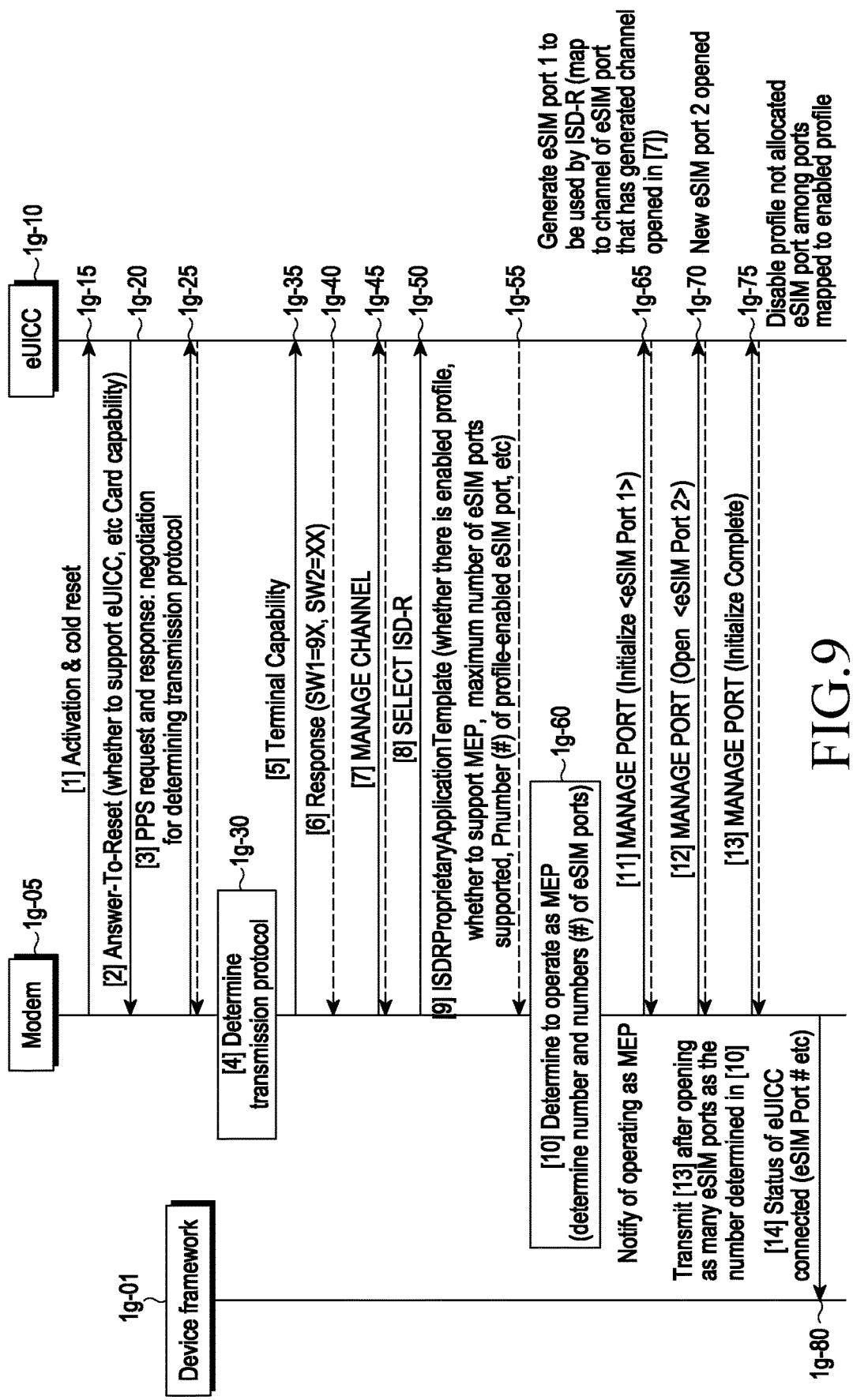
FIG. 9 is a view schematically illustrating another example of an initialization process between a UE and an eUICC based on ISD-R provision information in a wireless communication system according to various embodiments of the present disclosure.

FIG. 9 is a view schematically illustrating another example of an initialization process between a UE and an eUICC based on ISD-R provision information in a wireless communication system according to various embodiments of the present disclosure.

Referring to FIG. 9, some operations of FIG. 9 may be performed similarly to some operations of FIG. 7. If the eUICC card is inserted into the UE, the modem 1g-05 recognizes the eUICC 1g-10 and performs activation and cold reset to set an operating environment for an operation with the eUICC card, such as power supply, clock synchronization, current, and voltage, to use the card. If the setting of the operating environment to use the eUICC is completed, the eUICC 1g-10 replies to the UE modem 1g-05 with an answer to reset (ATR) message. The ATR is a message first transmitted from the eUICC card to the UE, and message blocks composed of up to 32 bytes are transmitted in a continuous chain.

The eUICC 1g-10 may include information as to whether to support the eUICC functionality defined in GSMA SGP. 22, through one of the message blocks defined as interface bytes among the message blocks of the ATR message and may reply (1g-20) to the modem 1g-05. According to an embodiment, the eUICC 1g-10 may reply with the ATR message including information indicating the supported transmission protocol and whether it is possible to change the transmission protocol. Thus, the modem 1g-05 may determine to use the transmission protocol supported by the eUICC card as it is or, if the ATR includes an identifier for the capability of changing the transmission protocol, additionally transmit a request for determining the transmission protocol and parameter to the eUICC 1g-10, thereby finally determining (1g-30) by the modem 1g-05 through (1g-25) the process of negotiating the transmission protocol to be used between the modem 1g-05 and the eUICC 1g-10. The UE and the eUICC card may transmit an application protocol data unit (APDU) message using either T=0 or T=1 which is the transmission protocol defined in ISO 7816-3, determined through the operation 1g-30. The APDU is a data unit consisting of a command-response pair and may be used to process a message from an application to another application.

The modem 1g-05 transmits (1g-35), to the eUICC 1g-10, a message including the UE capability including the capability in the UE related to the eUICC defined in SGP. 22, such as whether the UE supports the LPA or supports the enterprise function. The eUICC 1g-10, which receives the UE capability message, may recognize that the UE is a UE supporting the eUICC and set the setting value in the eUICC appropriate therefor, and reply with SW1=9X, SW2=XX, as a normal response code for the APDU command and reply (1g-40) to the modem 1g-05. In the SW, X may denote a specific number. For example, X may be one of SW1=90, SW2=00 or SW1=91, SW2=XX. The modem 1g-05, which receives the response message, may generate a manage channel APDU command for channel opening and transmit (1g-45) the manage channel APDU command to the eUICC 1g-10. As a normal response is received from the eUICC 1g-10 as a response to the manage channel APDU command, the channel generation for APDU transmission between the modem 1g-05 and the eUICC 1g-10 is completed. The ISD-R in the eUICC 1g-10 is a module for managing the profile in the eUICC. Only the LPA may select the ISD-R, and the ISD-R may transmit/receive APDUs through one selected channel.

According to an embodiment, if the modem 1g-05 requires reception of additional information from the ISD-R of the eUICC 1g-10 in the process of initialization between modem and eUICC card, the modem 1g-05 may select (1g-50) the ISD-R. If the modem 1g-05 selects the ISD-R, the eUICC 1g-10 including the ISD-R may provide (1g-55) the modem 1g-05 with a reply value including one or more of whether there is an enabled profile, whether MEPs are supported, the maximum number of openable profile eSIM ports, and the number or numbers of profile enabled eSIM ports through the ISDR ProprietaryApplicationTemplate. The modem 1g-05, which receives the information, determines whether to operate with MEPs in combination of the information received through the ISDR ProprietaryApplicationTemplate as described above in connection with FIG. 7 or 8 (received through the ATR in FIG. 7 and received through the reply value (or response message) of the UE capability in FIG. 8) and the information obtained by the UE and designate the number and numbers of eSIM ports to be opened (1g-60). If the modem 1g-05 determines to operate with MEPs through the determination (1g-60), the modem 1g-05 transmits an initialize APDU command for MANAGE PORT to the eUICC 1g-10, thereby informing to operate with MEPs while simultaneously requesting to generate a port. The eUICC 1g-10, which receives the MANAGE PORT message, may generate an eSIM port (as an embodiment, eSIM port 1) to be used by the ISD-R, map the channel generated in the operation 1g-45 to the channel of the eSIM port to be used by the ISD-R, and reply with a response message (1g-65). The response message in the operation 1g-65 may include ATR information about the logical interface.

Thereafter, the modem 1g-05 may designate as many numbers as the number of eSIM ports determined in the operation 1g-60 and send a request (1g-70) for eSIM ports to be used for profile connecting the open APDU command for MANAGE PORT to the eUICC 1g-10. The eUICC 1g-10 may open as many new eSIM ports as the number of open APDU commands requested in response to the request in the operation 1g-70. According to an embodiment, if the number of open APDU commands requested is 1, eSIM port 2 may be opened. As described above with reference to FIG. 7, a number of the port to be opened may be designated, included, and transmitted in a corresponding open MANAGE PORT APDU command. If transmitted without the port number, the eUICC may designate a port number and reply to it with a response value. If the eUICC 1g-10 opens the generated eSIM port, completes the connection, and replies, the modem 1g-05 may transmit an initialize complete (1g-75) through a MANAGE PORT command to notify that all necessary ports have been opened, notifying the eUICC 1g-10 that all eSIM port open requests to operate with MEPs have been completed. Upon receiving the initialize complete message with the MEPs, the eUICC 1g-10 may disable profiles not allocated eSIM ports among the ports mapped to the self-enabled profiles. It is also possible to treat the profile as disabled while maintaining the profile in the enabled state. Meanwhile, the modem 1g-05 may transfer (1g-80), to the UE framework (device framework) 1g-01, status information about the connected eUICC, such as the ISD-R use eSIM port finally determined by referring to the information obtained from the eUICC 1g-10 and generated profile eSIM port # (the number of eSIM ports or the respective numbers of the eSIM ports) so that the status information may be utilized in the application of the UE or the system.

Figure 10:
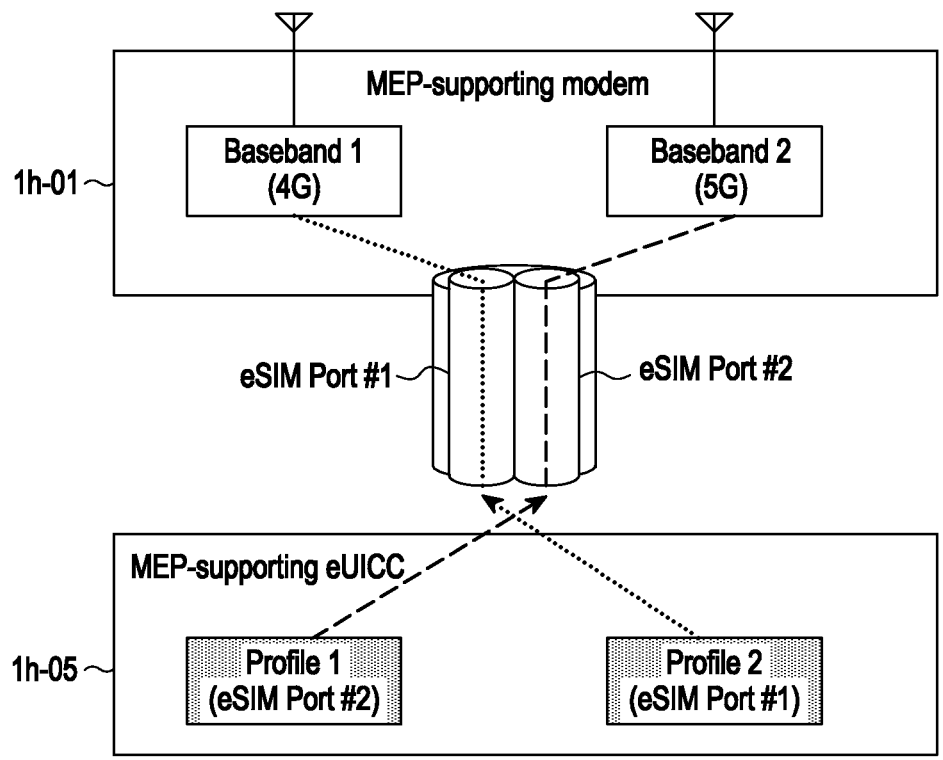
FIG. 10 is a view schematically illustrating a connection between a modem and an eUICC for maintaining an existing setting upon rebooting in an MEP-supporting UE in a wireless communication system according to various embodiments of the present disclosure.

FIG. 10 is a view schematically illustrating a connection between a modem and an eUICC for maintaining an existing setting upon rebooting in an MEP-supporting UE in a wireless communication system according to various embodiments of the present disclosure.

When the UE is powered off and then back or a removable eUICC is inserted into the UE to thereby reset and reboot the UE and the eUICC, an MEP-supporting modem 1h-01 and an MEP-supporting eUICC 1h-05 may process to maintain the association between baseband, eSIM port, and profile before rebooting. Upon receiving an ES10c. enabledProfile (profile ID or application ID, port # to be activated) to activate the profile in a specific eSIM port, the eUICC may activate the profile and store mapping information between the profile and the eSIM port in the metadata of the profile. As described above, if there is an eSIM port for which the profile is enabled in the process of initialization between the UE and the eUICC 1h-05, the eUICC 1h-05 may reply to the modem 1h-01 with the number of the profile-enabled eSIM port, through one of an ATR, UE capability response message, ISDR ProprietaryApplicationTemplate, FCP template, and logical interface management APDU response. Meanwhile, the modem 1h-01 may retain the previously set baseband-eSIM port mapping information and, upon receiving information about the profile-enabled eSIM port from the eUICC 1h-05, may reestablish a connection to the eSIM port provided by the eUICC 1h-05 and process mapping to the same eSIM port. FIG. 10 illustrates an example implementation thereof.

According to various embodiments, it is assumed in FIG. 10 that in the MEP-supporting modem 1h-01, baseband 1 (supporting 4G) is connected to eSIM port #1, and baseband 2 (supporting 5G) is connected to eSIM port #2 and, in the MEP-supporting eUICC 1h-05, profile 1 is activated in eSIM port #2, and profile 2 is activated in eSIM port #1. If rebooting is performed so that initialization between UE and card is performed, the eUICC 1h-05 may reply to the modem 1h-01 with the numbers #1 and #2 of the eSIM ports for which the profile is enabled in the process of initialization with the UE, through at least one of the response message of the UE capability, the ISDR ProprietaryApplicationTemplate, logical interface management APDU or FCP template. Upon receiving the information to determine whether the modem 1h-01 operates with MEPs, the modem may recognize that it is needed to generate at least two or more eSIM ports for profile connection based on the previously stored eSIM port-baseband mapping information and may eSIM port #1 to baseband 2 (5G) and eSIM port #2 to baseband 1 (4G). If the received port number is not mapped with the pre-stored port number (e.g., when a removable eUICC is inserted), the UE may determine that the corresponding eUICC is a new eUICC, newly map a port number, and process the initialization procedure. Meanwhile, the eUICC 1h-05 may process connection to allow profile 2 to be activated in eSIM port #1 and profile 1 to be activated in eSIM port #2 based on the eSIM port number-profile mapping information previously stored as profile information.

Figure 11:
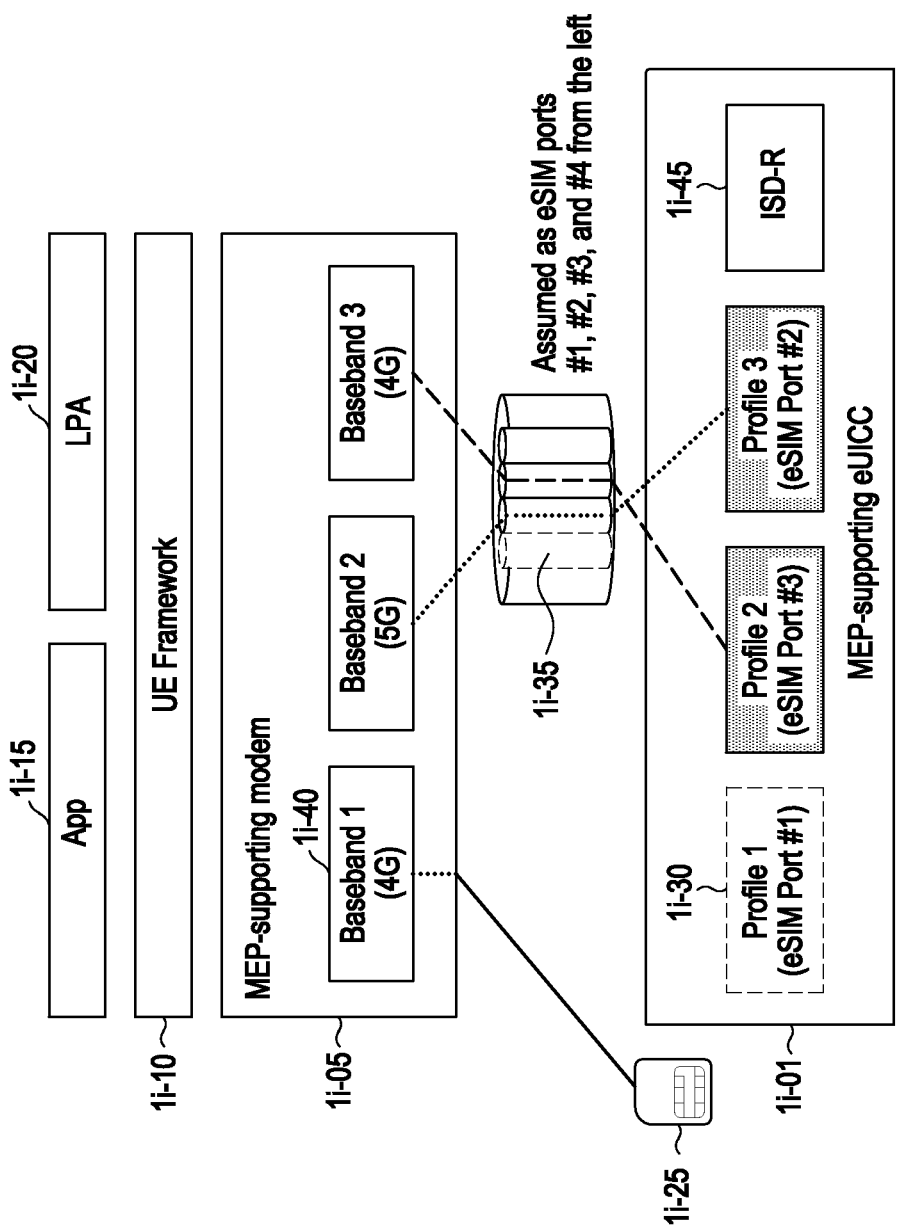
FIG. 11 is a view schematically illustrating operations of a UE and an eUICC when a user changes an eSIM port to a pSIM in a wireless communication system according to various embodiments of the present disclosure.

FIG. 11 is a view schematically illustrating operations of a UE and an eUICC when a user changes an eSIM port to a pSIM in a wireless communication system according to various embodiments of the present disclosure.

The MEP-supporting UE may be a UE that supports the eUICC only or both the eUICC and the SIM card (pSIM). If the UE supports both the eUICC and the physical SIM card (pSIM), the UE is also possible for the case in which the UE is to switch to the pSIM instead of one activated profile. For convenience, it is assumed in FIG. 11 that while three profiles are activated in the MEP-supporting eUICC 1i-01, one of them is replaced with a pSIM. According to an embodiment, the modem 1i-05 may map the eSIM port generated for connection with the profile, as a result of initialization by the UE and the card, corresponding to the SIM slot, like eSIM port 1=SIM 1, eSIM port 2=SIM 2, and eSIM port 3=SIM 3, and provide this to the UE's framework 1i-10. In the UE application (app) 1i-15, the profile may be expressed equivalently to one physical SIM card.

The user may select to use the physical SIM card 1i-25 instead of profile 1 1i-30 activated in eSIM port #1 through a UI provided from a UE app (e.g., a SIM card manager app).

Upon receiving a corresponding request, the UE app 1i-15 requests the LPA 1i-20 to deactivate SIM1.

The LPA 1i-20, which receives the command, transmits a command for requesting to deactivate the profile allocated to the eSIM port, as a dedicated eSIM port with the ISD-R 1i-45 (here, eSIM port #4 is allocated), i.e., profile 1, to the eUICC 1i-01, obtains a result, and replies to the UE app 1i-15 with the result.

The UE app transmits a close command for the port to the UE framework and, upon receiving the close command, the modem closes the port and transmits a MANAGE PORT APDU command (e.g., as the MANAGE PORT APDU command, P1=close, P2=[number of the port to be closed, e.g., port #1]) for closing to the eUICC. The eUICC 1i-01 may optionally reply to the modem 1i-05 with the result and close the connection for eSIM port #1. The modem may associate the pSIM to baseband 1, map as pSIM=SIM 1, profile 2=SIM 2, profile 3=SIM 3, and reply to the UE framework with the result. The UE framework may re-reply to the UE app with it. Meanwhile, the modem 1i-05 may maintain, rather than processing, the eSIM port close. In this case, without transmitting the MANAGE PORT APDU command for close to the eUICC, the modem may later map to SIM1 in UE F/W so that the received message is connected to the pSIM. In a case where there is a message transmitted from the eUICC through eSIM port #1 to the modem 1i-05, this should be disregarded so as not to be processed but, in a case where the message received to eSIM port #1 is a REFRESH command transmitted by the ISD-R, it may be exceptionally allowed to be processed.

The UE app may signify and show the physical SIM card 1i-25, instead of profile 1 1i-30 activated in eSIM port #1, as activated. Afterwards, upon request for information about the SIM slot from the app to the UE framework, the UE framework may recognize mapping as pSIM=SIM 1, profile 2=SIM 2, and profile 3=SIM 3 and reply.

Meanwhile, through the UI of the UE app, the user may switch the pSIM to one activated profile. For example, in the drawings, it is also possible to replace the pSIM 1i-25 with profile 1 1i-30, with two profiles activated in the MEP-supporting eUICC 1i-01.

In this case, the modem 1i-05 may map the eSIM port generated for connection with the profile, as a result of initialization by the UE and the card, corresponding to the SIM slot, like pSIM=SIM 1, eSIM port 2=SIM 2, and eSIM port 3=SIM 3, and provide this to the UE's framework 1i-10. In the UE app 1i-15, the profile may be expressed equivalently to one physical SIM card.

The user may select to activate and use profile 1 1i-30 instead of the physical SIM card 1i-25 through a UI provided from a UE app (e.g., a SIM card manager app).

The UE app 1i-15, which received the request, may request the modem 1i-05 to process the SIM Port Close through the UE F/W 1i-10 (e.g., P1=Close as MANAGE CHANNEL APDU command) and to open a port to be used in profile 1 1i-30 (e.g., P1=Open as MANAGE PORT APDU command). The modem 1i-05 may maintain, rather than processing, the SIM port close.

The modem, which receives the command, may close connection with the SIM port, change the settings to eSIM port 1=SIM 1, and reply to the UE F/W 1i-10 with the information so that the UE app 1i-15 or the LPA 1i-20 may be aware of it. Further, the modem may transmit a port open (e.g., as the MANAGE PORT APDU command, P1=open) to the eUICC 1i-01, thereby generating a new port. The UE app 1i-15 requests the LPA 1i-20 to activate the profile in SIM 1 (eSIM port 1). The LPA 1i-20, which receives the request, transmits a command for requesting the eSIM port to activate profile 1, as a dedicated eSIM port with the ISD-R 1i-45 (here, eSIM port #4 is allocated), i.e., profile 1, to the eUICC 1i-01, obtains a result, and replies to the UE app 1i-15 with it. The UE app may signify and show profile 1 1i-30, as activated, in eSIM port #1 instead of the physical SIM card 1i-25.

Figure 12:
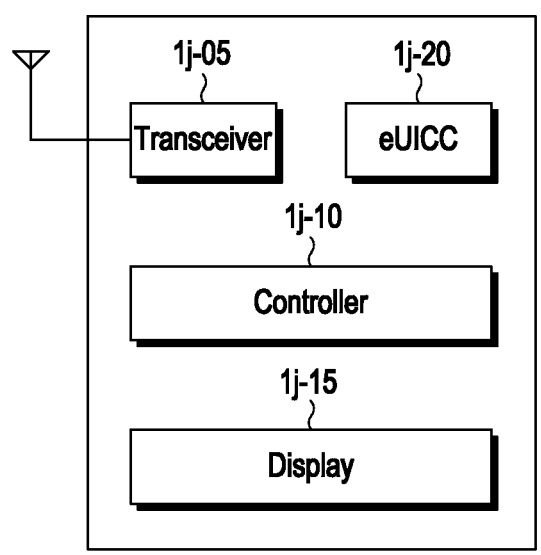
FIG. 12 is a view schematically illustrating an example of an internal structure of a UE in a wireless communication system according to various embodiments of the present disclosure.

FIG. 12 is a view schematically illustrating an example of an internal structure of a UE in a wireless communication system according to various embodiments of the present disclosure.

Referring to FIG. 12, a UE may include at least one of a controller 1j-10, a transceiver 1j-05, a display 1j-15, and an eUICC 1j-20.

The transceiver 1j-05 may correspond to a modem as described in the disclosure and may transmit/receive signals with an SM-DP+.

The controller 1j-10 of the UE may perform operations according to various embodiments by controlling states and operations of all of the components of the UE components described in the disclosure. For example, the controller 1j-10 may control at least one of the LPA, modem, and eUICC to thereby perform operations according to various embodiments.

The display 1j-15 may display, to the user, all or part of port information, profile status information, profile lists, or providable RAT information according to various embodiments.

The eUICC 1j-20 may be controlled by the LPA or the controller 1j-10, and in various embodiments, the eUICC may perform each management command and transfer proactive commands to, e.g., the modem. The eUICC 1j-20 may be configured as a device separate from the UE and may include a separate controller and a separate transceiver. When the eUICC 1j-20 is configured as a separate device, the operations of the eUICC according to various embodiments may be controlled to be performed by a separate controller included in the eUICC.

Another example of an internal structure of a UE in a wireless communication system according to various embodiments is described below with reference to FIG. 13.

Figure 13:
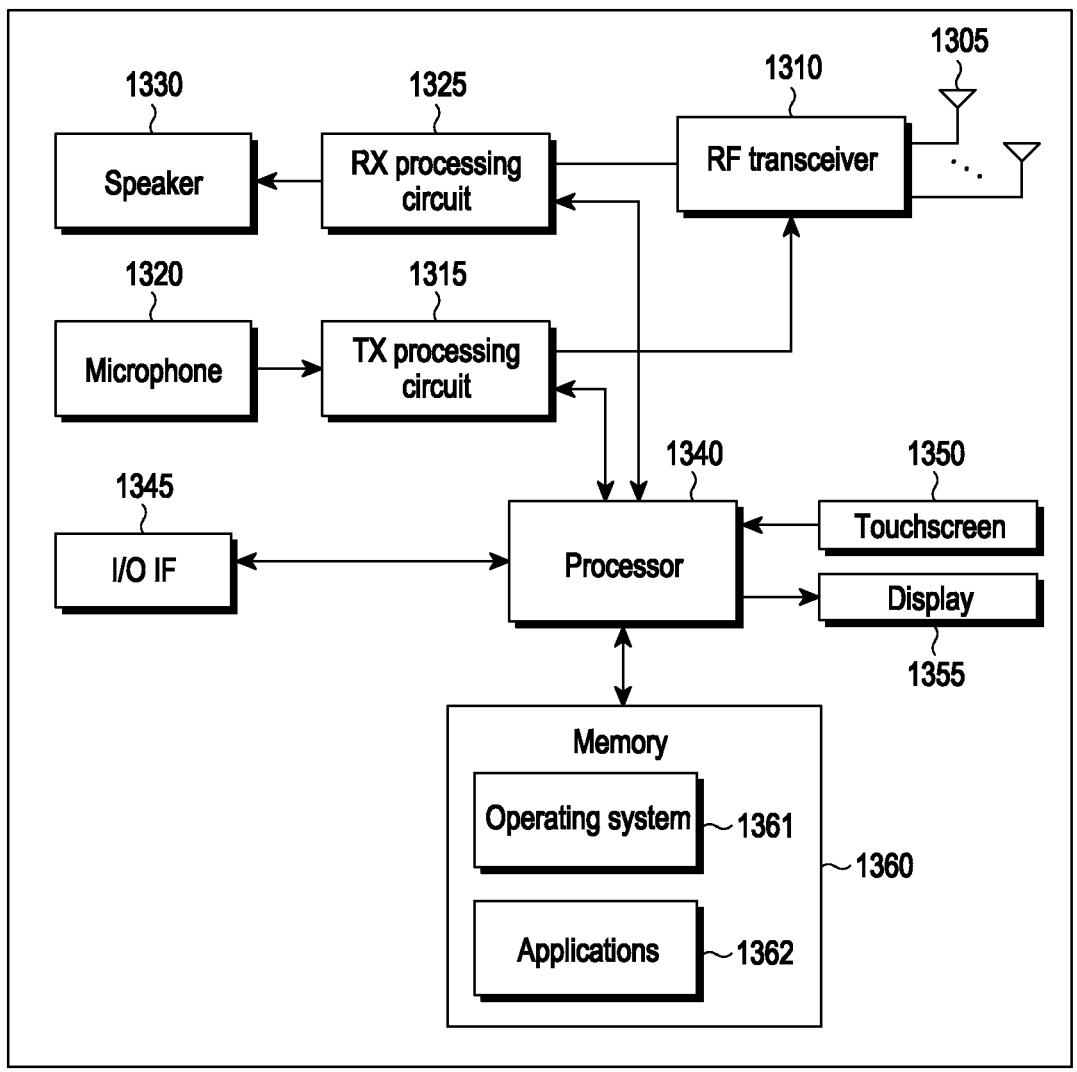
FIG. 13 is a view schematically illustrating another example of an internal structure of a UE in a wireless communication system according to various embodiments of the present disclosure.

FIG. 13 is a view schematically illustrating another example of an internal structure of a UE in a wireless communication system according to various embodiments of the present disclosure.

The embodiment of the UE illustrated in FIG. 13 is for illustrative purposes only, and the scope of the disclosure is not limited thereto.

As illustrated in FIG. 13, the UE may include an antenna 1305, a radio frequency (RF) transceiver 1310, a transmit (TX) processing circuit 1315, a microphone 1320, and a receive (RX) processing circuit 1325. The UE further includes a speaker 1330, a processor 1340, an input/output (I/O) interface (IF) 1345, a touch screen 1350, a display 1355, and a memory 1360. The memory 1360 includes an operating system (OS) 1361 and one or more applications 1362.

The RF transceiver 1310 receives an input RF signal transmitted from a base station in a network, via the antenna 1305. The RF transceiver 1310 down-converts the input RF signal, generating an intermediate frequency (IF) or baseband signal. The IF or baseband signal is transmitted to the RX processing circuit 1325, and the RX processing circuit 1325 filters, decodes, and/or digitizes the baseband or IF signal, generating a processed baseband signal. The RX processing circuit 1325 sends the processed baseband signal to the speaker 1330 (e.g., for speech data) or the processor 1340 (e.g., for web browsing data) for further processing.

The TX processing circuit 1315 receives analog or digital speech data from the microphone 1320 or other output baseband data (e.g., web data, emails, or interactive video game data) from the processor 1340. The TX processing circuit 1315 encodes, multiplexes, and/or digitizes the output baseband data, generating a processed baseband or IF signal. The RF transceiver 1310 receives the processed baseband or IF signal output from the TX processing circuit 1315 and up-converts the baseband or IF signal into an RF signal which is to be transmitted through the antenna 1305.

The processor 1340 may include one or more processors or other processing devices, and may execute the OS 1361 stored in the memory 1360 to control the overall operation of the UE. As an example, the processor 1340 may control reception of downlink channel signals and transmission of uplink channel signals by the RF transceiver 1310, the RF processing circuit 1325, and the TX processing circuit 1315 according to known principles. According to some embodiments, the processor 1340 includes at least one microprocessor or microcontroller.

According to various embodiments, the processor 1340 controls the overall operation related to a scheme for initialization between a UE and an eUICC so that several profiles may simultaneously be activated and used even on a UE equipped with one eUICC in a wireless communication system.

According to various embodiments, the processor 1340 controls the overall operation related to a scheme for transferring predetermined information for supporting MEPs, including the number of profile-enabled eSIM ports or their respective numbers and all or some of a maximum number of eSIM ports that may be open, from an eUICC to a UE in a wireless communication system.

According to various embodiments, the processor 1340 controls the overall operation related to a scheme for determining whether to operate as a MEP through a combination of, e.g., predetermined information about MEP support obtained by a UE from an eUICC in a wireless communication system, the number of available basebands, and radio access technology (RAT) per baseband, and determining settings, such as of the number of eSIM ports to open, the number to be assigned to the eSIM port, and the eSIM port to use the ISD-R.

According to various embodiments, the processor 1340 controls the overall operation related to a scheme for transferring information set and determined as to whether to operate as a MEP from a UE to an eUICC in a wireless communication system.

According to various embodiments, the processor 1340 controls the overall operation related to a scheme in which, in a wireless communication system, an eUICC recognizes operating as a MEP, generates an eSIM port and assigns a number, maps the eSIM port number with a profile, determines the eSIM port to be used by the ISD-R, and replies to the UE with the results of processing.

According to various embodiments, the processor 1340 controls the overall operation related to a scheme for generating as many eSIM ports as the number of eSIM ports determined by a UE in a wireless communication system and then replying to an eUICC with termination of an initialization procedure to operate as a MEP.

According to various embodiments, the processor 1340 controls the overall operation related to a scheme for closing an eSIM port connection generated by a UE and processing connection with a corresponding pSIM in a case where the user deactivates one of profiles activated in a MEP-supporting eUICC and uses the pSIM in a wireless communication system.

According to various embodiments, the processor 1340 controls the overall operation related to a scheme in which, in a wireless communication system, an eUICC recognizes an eSIM Port Close request and processes the eSIM Port Close request and then replies to a modem with the results.

The processor 1340 may move data into or out of the memory 1360 as required by a running process. According to some embodiments, the processor 1340 is configured to execute the applications 1362 based on the OS program 1361 or in response to signals received from base stations or the operator. The processor 1340 is coupled to the I/O interface 1345, and the I/O interface 1345 provides the UE with connectibility to other devices, e.g., laptop computers and handheld computers. The I/O interface 1345 is a communication path between these accessories and the processor 1340.

The processor 1340 is also connected to the touch screen 1350 and the display 1355. The operator of the UE may input data into the UE using the touch screen 1350. The display 1355 may be a liquid crystal display, a light emitting diode display, or other displays capable of rendering text and/or at least limited graphics, such as from websites.

The memory 1360 is connected to the processor 1340. A portion of the memory 1360 may include a random access memory (RAM), and the remainder of the memory 1360 may include a flash memory or a read-only memory (ROM).

Although FIG. 13 illustrates an example UE, various changes may be made thereto. For example, various components of FIG. 13 may be combined together, each component may be further divided, or some components may be omitted, or other components may be added as necessary. As an example, the processor 1340 may be divided into multiple processors, such as one or more central processing units (CPUs) and one or more graphics processing units (GPUs). Although the UE is configured like a mobile phone or a smart phone in FIG. 13, the UE may be configured to operate as a different type of mobile or stationary device.

Figure 14:
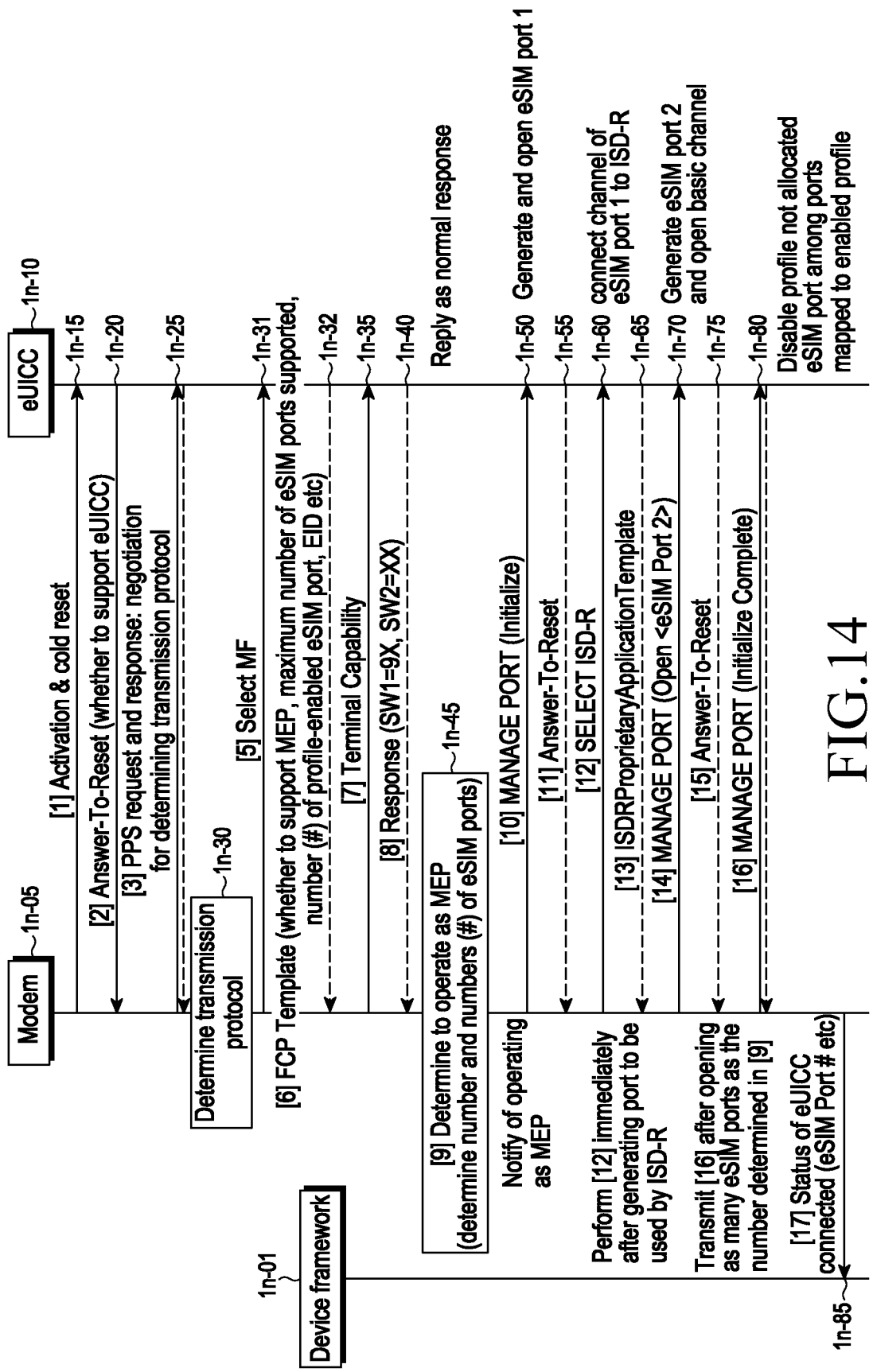
FIG. 14 is a view schematically illustrating another example of an initialization process between a UE and an eUICC based on an FCP template in a wireless communication system according to various embodiments of the present disclosure.

FIG. 14 is a view schematically illustrating another example of an initialization process between a UE and an eUICC based on an FCP template in a wireless communication system according to various embodiments of the present disclosure.

Referring to FIG. 14, some operations of FIG. 14 may be performed similarly to some operations of FIG. 7. According to an embodiment, operations 1*n*-15 to 1*n*-30 and 1*n*-45 to 1*n*-85 of FIG. 14 may be performed similarly to operations 1*e*-15 to 1*e*-30 and 1*e*-45 to 1*e*-85 of FIG. 7.

Although not described in connection with FIGS. 7 to 9, a modem 1*n*-05 may receive an ATR and then implicitly transmit an APDU to select (1*n*-31) a master file (MF) to an eUICC 1*n*-10. The modem 1*n*-05 may request to transmit an FCP template as a reply value to the APDU transmitted to select the MF. The reply value may be included in a response message to the APDU transmitted to select the MF. Through the FCP template, the eUICC 1*n*-10 may reply with predetermined information necessary for determining to operate with MEPs. The predetermined information may include one or more of whether multiple enabled profiles (MEPs) are supported, the maximum number of openable eSIM ports, the number and the numbers of eSIM ports for which the profile is activated, and the eUICC ID (EID), like the information transmitted through an ATR in FIG. 7 (1*n*-32).

The modem 1*n*-05 may transmit (1*n*-35), to the eUICC 1*n*-10, a message including the UE capability including the capability in the UE related to the eUICC defined in SGP. 22, such as whether the UE supports the LPA or supports the enterprise function. The eUICC 1*n*-10, which receives the UE capability message, may recognize that the UE is a UE supporting the eUICC and set the eUICC setting value appropriate therefor, and reply with SW (Status Word)1=9X, SW2=XX, as a normal response code for the UE capability and reply (1*n*-40) to the modem 1*n*-05. In the SW, X denotes a specific number. For example, X may be one of SW1=90, SW2=00 or SW1=91, SW2=XX. The modem 1n-05, which receives the information included in the FCP template, may determine to operate with MEPs based on a combination of the occupancy statuses of the basebands and RAT information for each supported baseband and determine (1n-45) the number and the numbers of profile eSIM ports to be opened to activate the profile.

The subsequent procedure may be performed in the same manner as described in FIGS. 7 to 9. The method for determining whether the MEP-supporting UE (modem) operates with MEPs may determine to operate with MEPs in a case in which it is determined that there are two or more eSIM ports for which the profile was enabled based on replying information about the select MF of operation 1n-31 or may determine to operate with MEPs in a case in which the UE modem, LPA, and eUICC all support the MEPs. Although FIG. 14 illustrates that the determination of whether to operate with MEPs is performed in the operation 1n-45, the modem 1n-05 may receive whether MEPs are supported from the eUICC 1n-10 and then determine whether to operate with MEPs at a specific time before opening the logical interface.

The maximum number of profile eSIM ports to be open, as determined in the operation 1n-45 may be determined as the smaller of the maximum number of eSIM ports, which the eUICC 1n-10 may open, and the number of basebands not occupied. Here, the total number of eSIM ports to be opened when the ISD-R-dedicated eSIM port is used may be the maximum number of profile eSIM ports plus one.

If the eUICC 1n-10 does not transmit the information about the maximum number of profile eSIM ports openable, the UE may determine the number of profile eSIM ports to open so as to open as many ports as the maximum number of unoccupied basebands. The subsequent procedure 1n-50 to 1n-85 may be processed in the same or similar manner to that disclosed in FIGS. 7 to 9. As described above, the information 1n-32, received from the eUICC 1n-10 through the FCP template, which is the response message of the Select MF, by the modem 1n-05, may be transmitted (1n-85) to the UE framework (device framework) 1n-01 by the modem 1n-05. Although it is illustrated in the drawings that the information received from the eUICC 1n-10 is transmitted to the UE framework 1n-05 at the time of completion of port generation, it is also possible to immediately transmit the information, received from the eUICC 1n-10, after the time of obtaining information from the eUICC 1n-10 by the modem 1n-05. In other words, according to various embodiments, the time of transmission of the information, received from the eUICC 1n-10, the UE framework 1n-01 may be adjusted as necessary.

Figure 15:
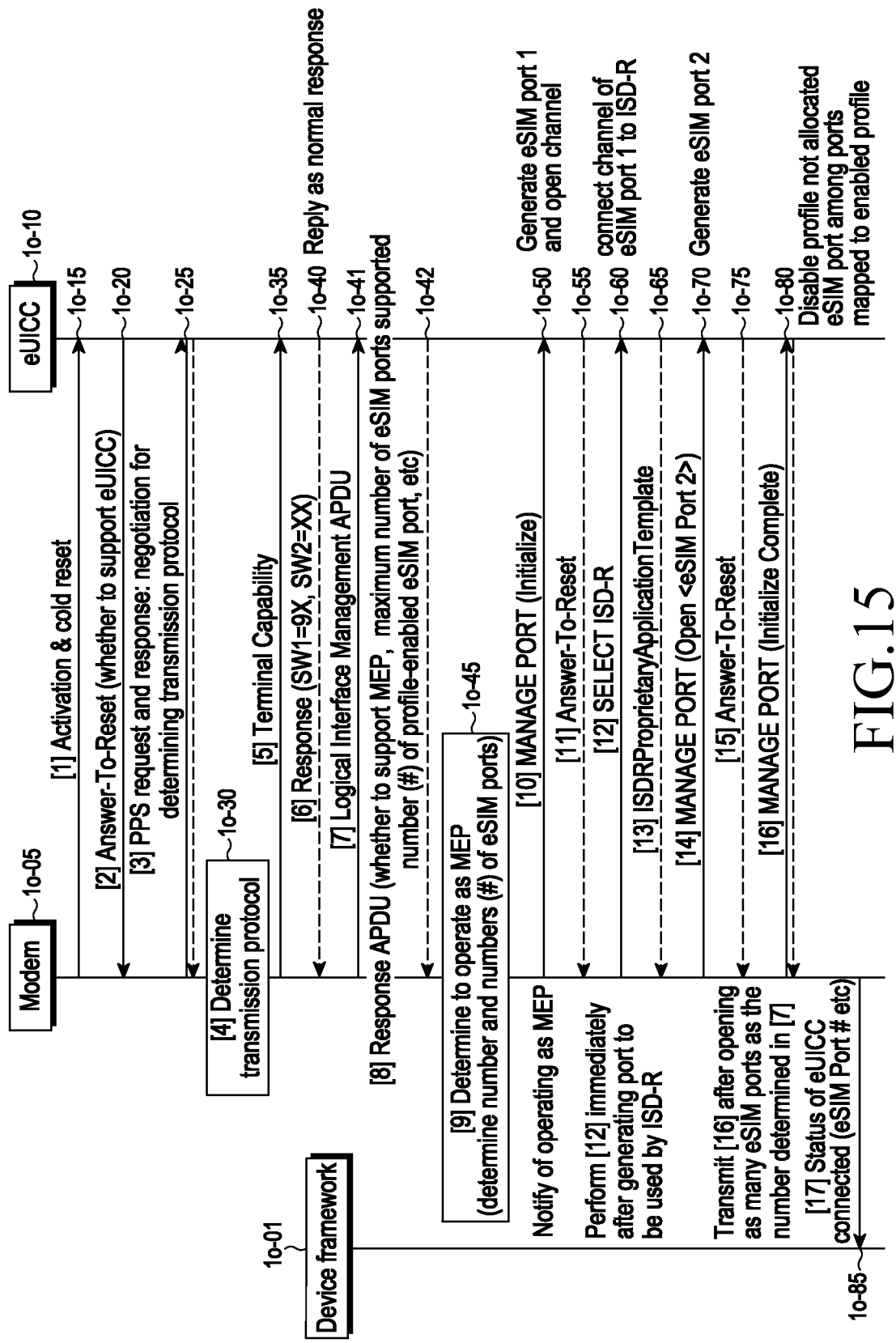
FIG. 15 is a view schematically illustrating another example of an initialization process between a UE and an eUICC based on a new logical interface management APDU and its response in a wireless communication system according to various embodiments of the present disclosure.

FIG. 15 is a view schematically illustrating another example of an initialization process between a UE and an eUICC based on a new logical interface management APDU and its response in a wireless communication system according to various embodiments of the present disclosure.

Referring to FIG. 15, some operations of FIG. 15 may be performed similarly to some operations of FIG. 7. According to an embodiment, operations 1o-15 to 1o-40 and 1o-50 to 10-85 of FIG. 15 may be performed similarly to operations 1e-15 to 1e-40 and 1e-50 to 1e-85 of FIG. 7. FIG. 15 is a view schematically illustrating another example of an initialization process between a UE and an eUICC based on a new logical interface management APDU and its response in a wireless communication system according to various embodiments.

Referring to FIG. 15, some operations of FIG. 15 may be performed similarly to some operations of FIG. 7. According to an embodiment, operations 1o-15 to 1o-40 and 1o-50 to 1o-85 of FIG. 15 may be performed similarly to operations 1e-15 to 1e-40 and 1e-50 to 1e-85 of FIG. 7. As described above in connection with FIG. 14, the modem 1o-05 may receive (1o-20) an ATR from the eUICC 1o-10 and then implicitly transmit an APDU for selecting an MF to the eUICC and may request to transmit an FCP template as a reply value to the transmitted APDU. The FCP template is an APDU supported by the eUICC and may be replied including information about whether the APDU is supported for managing a new logical interface.

Alternatively, the modem 1o-05 may explicitly notify (1o-35) of a new APDU supported through the UE capability or provide information about whether MEPs are supported to the eUICC 1o-10, thus notifying the eUICC 1o-10 whether the APDU is supported for managing a new logical interface used to operate with MEPs. According to an embodiment, the modem 1o-05 may transmit a logical interface management APDU to the eUICC 1o-10 (1o-41). The eUICC 1o-10 may reply to the modem 1o-05 at least one of whether MEPs are supported, the maximum number of supported eSIM ports, profile enabled eSIM port # (the number or the respective numbers of eSIM ports), and EID, as predetermined information necessary to determine to operate with MEPs, as a response to the logical interface management APDU (a reply value for a new APDU for logical interface management) (1o-42).

According to various embodiments, after receiving the ATR, the modem 1o-05 may be connected, for a card session, with the eUICC 1o-10 and, from the time when the session is connected, the modem 1o-05 and the eUICC 1o-10 become a state in which the modem 1o-05 and the eUICC 1o-10 may transmit an APDU. Thus, in the case of receiving information about whether a new APDU is supported for MEP support or whether MEPs are supported, as well as information about whether the eUICC 1o-10 is supported through the ATR 1o-20, at a specific time after receiving the ATR, the modem 10-05 may transmit an APDU command for the new logical interface management to the eUICC 1o-10 and receive configuration information about MEP support to determine (1o-45) whether to operate with MEPs. The specific time after receiving the ATR may be a time before transmitting the UE capability or performing the select MF.

The modem 1o-05, which receives the information from the eUICC 1o-10, may determine to operate with MEPs based on a combination of the occupancy statuses of the basebands and RAT information for each supported baseband and determine (1o-45) the number and the numbers of profile eSIM ports to be opened to activate the profile.

The subsequent procedure may be performed in the same manner as described in FIGS. 7 to 9. The method for determining whether the MEP-supporting UE (modem) operates with MEPs may determine to operate with MEPs in a case in which it is determined that there are two or more eSIM ports for which the profile was enabled based on replying information 1o-42 about the logical interface management APDU or may determine to operate with MEPs in a case in which the UE modem, LPA, and eUICC all support the MEPs. Although FIG. 15 illustrates that the determination of whether to operate with MEPs is performed in the operation 1o-45, the modem 1o-05 may receive whether MEPs are supported from the eUICC 1o-10 and then determine whether to operate with MEPs at a specific time before opening the logical interface.

The maximum number of profile eSIM ports to be opened in the operation 1o-45 may be determined as the smaller of the maximum number of eSIM ports, which the eUICC may open, and the number of basebands not occupied. Here, the total number of eSIM ports to be opened when the ISD-R-dedicated eSIM port is used may be the maximum number of profile eSIM ports plus one.

If the eUICC 1o-10 does not transmit the information about the maximum number of profile eSIM ports openable, the UE may determine the number of profile eSIM ports to open so as to open as many ports as the maximum number of unoccupied basebands. The subsequent procedure 1o-50 to 1o-85 may be processed in the same manner to that disclosed in FIGS. 7 to 9. As described above, the information 1o-42, received from the eUICC 1o-10 by the modem 1o-05, may be transmitted (1o-85) to the UE framework (device framework) 1o-01 by the modem 1o-05. Although it is illustrated in the drawings that the information received from the eUICC 1o-10 is transmitted to the UE framework 1o-05 at the time of completion of port generation, it is also possible to immediately transmit the information, received from the eUICC 1o-10, after the time of obtaining information from the eUICC 1o-10 by the modem 1o-05. In other words, according to various embodiments, the time of transmission of the information, received from the eUICC 1o-10, to the UE framework 1o-01 may be adjusted as necessary.

The UE according to various embodiments may be an electronic device, and the electronic device may be a device of various types. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the above-described specific embodiments, the components included in the disclosure are represented in singular or plural forms depending on specific embodiments provided. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a wireless communication system, the method comprising:
   indicating, by an embedded universal integrated circuit card (eUICC) included in the UE, support of functionality of the eUICC and support of a plurality of logical interfaces in an answer to reset (ATR) global interface byte;
   transmitting an application protocol data unit (APDU) associated with a logical interface to the eUICC; and
   receiving, from the eUICC, a first response data including a maximum number of embedded subscriber identification module (eSIM) ports supported for an enabled profile in response to the APDU,
   wherein a total number of eSIM ports used by the eUICC is a number of eSIM ports used for an enabled profile plus one eSIM port dedicated to an issuer security domain root (ISD-R).

2. The method of claim 1, further comprising transmitting, by a modem to the eUICC, a first message including information for a port creation completion after opening at least one eSIM port.

3. The method of claim 2, further comprising:
   transmitting, by the modem to the eUICC, a second message indicating that the at least one eSIM port opens; and
   receiving, by the modem from the eUICC, a third message including a reply to reset, wherein the third message corresponds to a logical interface through which the second message is transmitted.

4. The method of claim 1, further comprising:
   receiving, by a modem from the eUICC, information related to a multiple enabled profile (MEP) characteristic.

5. The method of claim 1, further comprising:
   transmitting, by a modem to the eUICC, capability information about the UE.

6. The method of claim 1, further comprising:
   receiving, by a modem from the eUICC, information about supported transmission protocol; and
   determining, by the modem, a transmission protocol based on the information about the supported transmission protocol.

7. A user equipment (UE) in a wireless communication system, comprising:
   an embedded universal integrated circuit card (eUICC) configured to indicate support of functionality of the eUICC and support of a plurality of logical interfaces in an answer to reset (ATR) global interface byte; and
   a modem operably coupled to the eUICC, the modem configured to:
   transmit an application protocol data unit (APDU) associated with a logical interface to the eUICC, and
   receive, from the eUICC, a first response data including a maximum number of embedded subscriber identification module (eSIM) ports supported for an enabled profile in response to the APDU,
   wherein a total number of eSIM ports used by the eUICC is a number of eSIM ports used for an enabled profile plus one eSIM port dedicated to an issuer security domain root (ISD-R).

8. The UE of claim 7, wherein the modem is further configured to transmit, to the eUICC, a first message including information for a port creation completion after opening at least one eSIM port.

9. The UE of claim 8, wherein the modem is further configured to:
   transmit, to the eUICC, a second message indicating that the at least one eSIM port opens, and
   receive, from the eUICC, a third message including a reply to reset, wherein the third message corresponds to a logical interface through which the second message is transmitted.

10. The UE of claim 7, wherein the modem is further configured to receive, from the eUICC, information related to a multiple enabled profile (MEP) characteristic.

11. The UE of claim 7, wherein the modem is further configured to transmit, to the eUICC, capability information about the UE.

12. The UE of claim 7, wherein the modem is further configured to:
   receive, from the eUICC, information about supported transmission protocol, and
   determine a transmission protocol based on the information about the supported transmission protocol.

13. The method of claim 1, further comprising:
   transmitting a command associated with a logical interface to the eUICC; and
   receiving, from the eUICC, a second response message including an ATR value.

14. The method of claim 13, wherein the command comprises at least one of information related to resetting, or an indication of an eSIM port to be configured.

15. The method of claim 1, further comprising:
   opening at least one eSIM port based on the indicated support of the plurality of the logical interfaces.

16. The UE of claim 7, wherein the modem is further configured to:
   transmit a command associated with a logical interface to the eUICC; and
   receive, from the eUICC, a second response message including an ATR value.

17. The UE of claim 16, wherein the command comprises at least one of information related to resetting, or an indication of an eSIM port to be configured.

18. The UE of claim 7, wherein the modem is further configured to open at least one eSIM port based on the indicated support of the plurality of the logical interfaces.

* * * * *